US008028567B2

(12) United States Patent
Kobayashi et al.

(10) Patent No.: US 8,028,567 B2
(45) Date of Patent: Oct. 4, 2011

(54) AFM TWEEZERS, METHOD FOR PRODUCING AFM TWEEZERS, AND SCANNING PROBE MICROSCOPE

(75) Inventors: Tatsuya Kobayashi, Takamatsu (JP); Masato Suzuki, Takamatsu (JP); Masatoshi Yasutake, Chiba (JP); Takeshi Umemoto, Chiba (JP)

(73) Assignees: AOI Electronics Co., Ltd., Takamatsu-shi (JP); SII Nano Technology Inc., Chiba-shi (JP)

( * ) Notice: Subject to any disclaimer, the term of this patent is extended or adjusted under 35 U.S.C. 154(b) by 669 days.

(21) Appl. No.: 12/143,410

(22) Filed: Jun. 20, 2008

(65) Prior Publication Data

US 2009/0000365 A1 Jan. 1, 2009

(30) Foreign Application Priority Data

Jun. 22, 2007 (JP) .................. 2007-165641

(51) Int. Cl.
*G01B 5/28* (2006.01)
*G01Q 30/20* (2010.01)
*G01Q 70/10* (2010.01)

(52) U.S. Cl. .................. 73/105; 850/5; 850/18; 850/40; 850/52; 850/56; 850/57; 850/60; 850/63; 977/962

(58) Field of Classification Search .................. 73/105; 850/1, 5, 18, 33, 40, 52, 56, 57, 60, 62, 63; 977/902, 962
See application file for complete search history.

(56) References Cited

U.S. PATENT DOCUMENTS

| 7,322,622 | B2* | 1/2008 | Hashiguchi et al. | 294/86.4 |
|---|---|---|---|---|
| 7,735,358 | B2* | 6/2010 | Bauza et al. | 73/105 |
| 7,770,474 | B2* | 8/2010 | Yasutake et al. | 73/863 |
| 7,849,515 | B2* | 12/2010 | Hashiguchi et al. | 850/18 |
| 7,866,205 | B2* | 1/2011 | Yasutake et al. | 73/105 |
| 2006/0243034 | A1 | 11/2006 | Chand et al. | |
| 2008/0295585 | A1* | 12/2008 | Konno et al. | 73/105 |
| 2008/0307866 | A1* | 12/2008 | Hiroki et al. | 73/105 |
| 2009/0000362 | A1* | 1/2009 | Hashiguchi et al. | 73/105 |

FOREIGN PATENT DOCUMENTS

JP 11-23586 A 1/1999
(Continued)

OTHER PUBLICATIONS

IEEJ Trans. SM, "Development of AFM Tweezers for Manipulation of Nanometer Size Objects", vol. 125, No. 11, (2005) with partial translation of Figure 2 (Eight (8) pages).

*Primary Examiner* — Daniel Larkin
(74) *Attorney, Agent, or Firm* — Crowell & Moring LLP

(57) ABSTRACT

AFM tweezers that include a first probe, including a triangular prism member having a tip of a ridge which is usable as a probe tip in a scanning probe microscope, and a second probe, including a triangular prism member provided so as to open/close with respect to the first probe, are provided. The first probe and the second probe are juxtaposed such that a predetermined peripheral surface of the triangular prism member of the first probe and a predetermined peripheral surface of the triangular prism member of the second probe face substantially in parallel to each other, and the first probe formed of a notch that prevents interference with a sample when the sample is scanned by the tip of the ridge.

11 Claims, 23 Drawing Sheets

FOREIGN PATENT DOCUMENTS

| | | |
|---|---|---|
| JP | 2000-193581 A | 7/2000 |
| JP | 2000-321291 A | 11/2000 |
| JP | 2001-252900 A | 9/2001 |
| JP | 2002-162335 A | 6/2002 |
| JP | 2002-350218 A | 12/2002 |
| JP | 2004-317255 A | 11/2004 |
| JP | 2007-322363 A | 12/2007 |
| WO | WO 2006/054771 A1 | 5/2006 |

\* cited by examiner

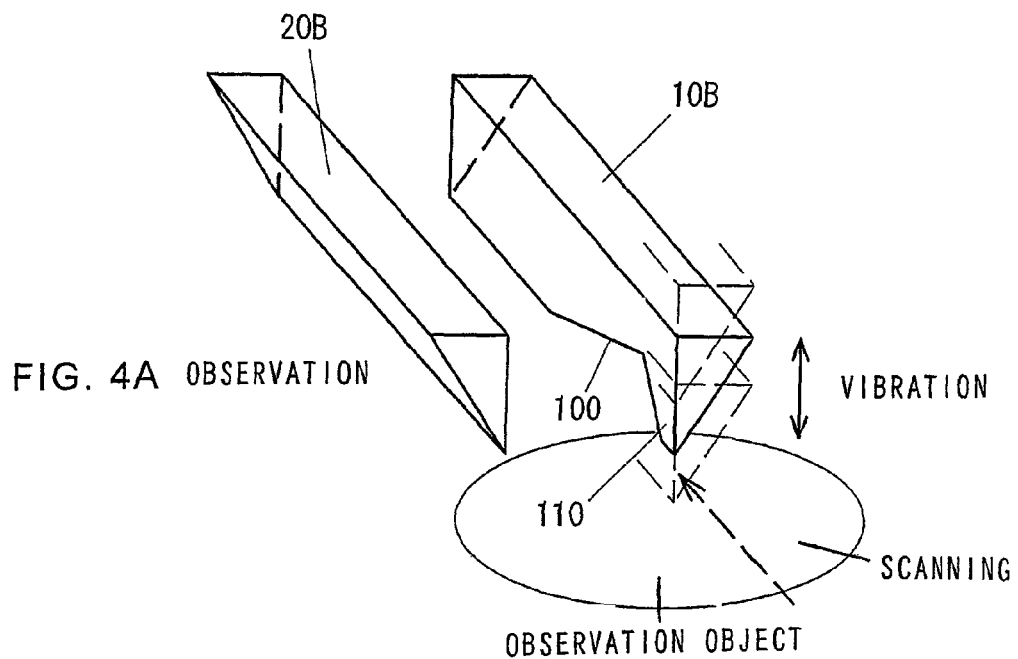
FIG. 4A OBSERVATION
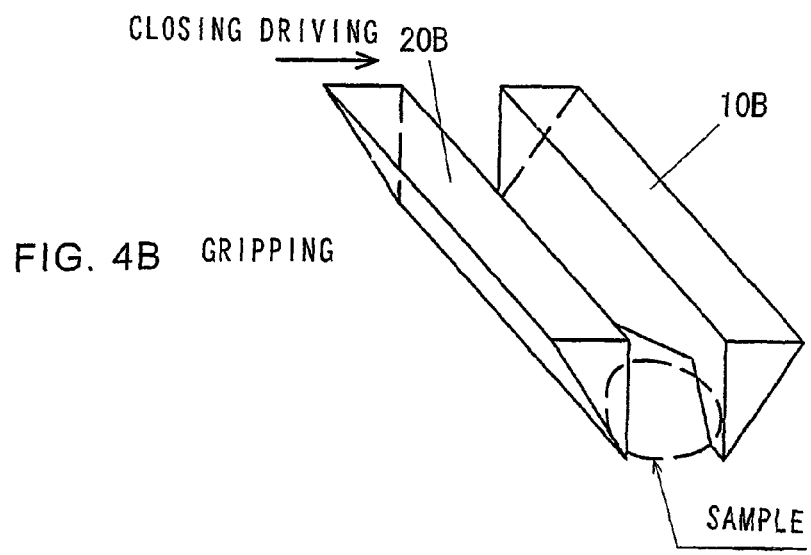
FIG. 4B GRIPPING

FIG. 10
(a1) STEP a
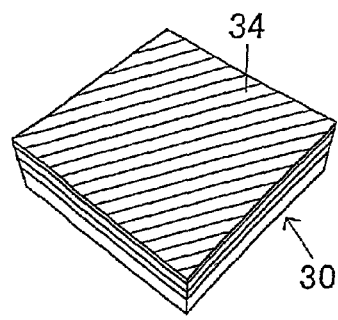
(a2) STEP a
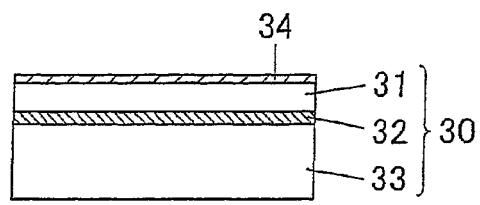
(b1) STEP b
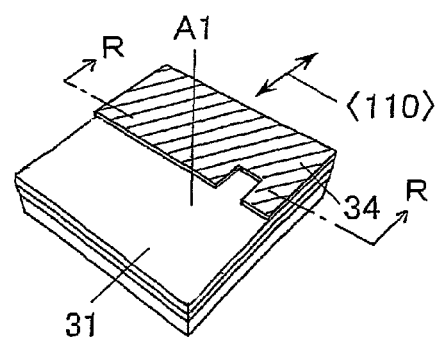
(b2) STEP b
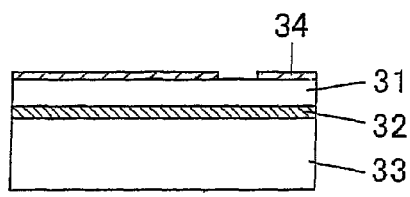
(R-R CROSS-SECTION)
(c1) STEP c
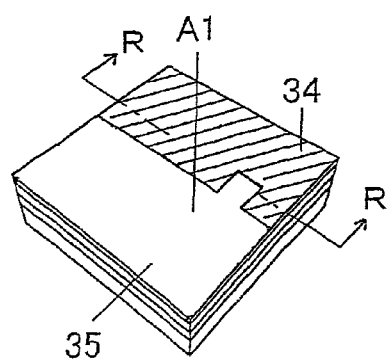
(c2) STEP c
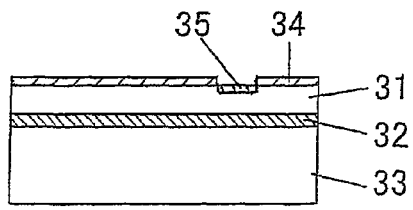
(R-R CROSS-SECTION)

MASK M1

FIG. 12
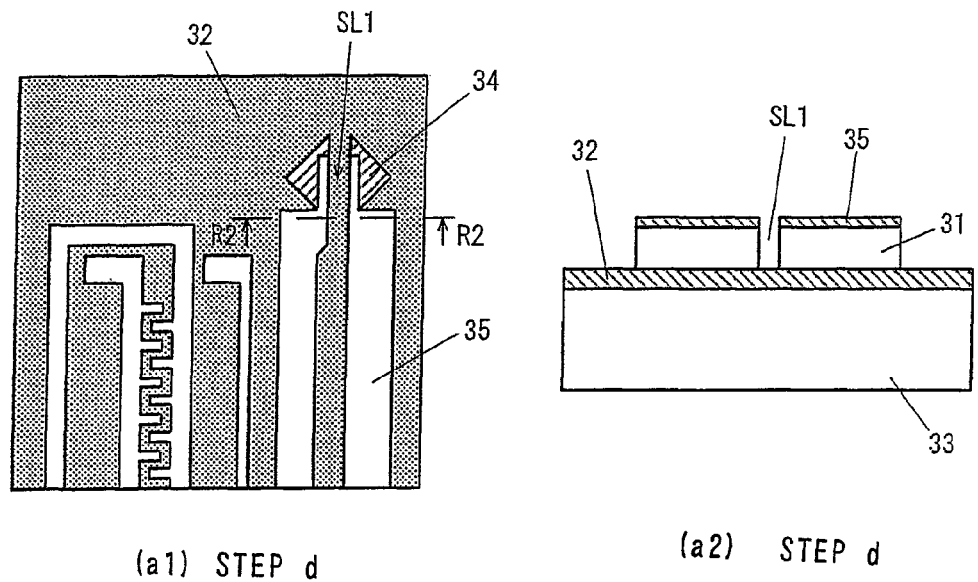
(a1) STEP d
(a2) STEP d
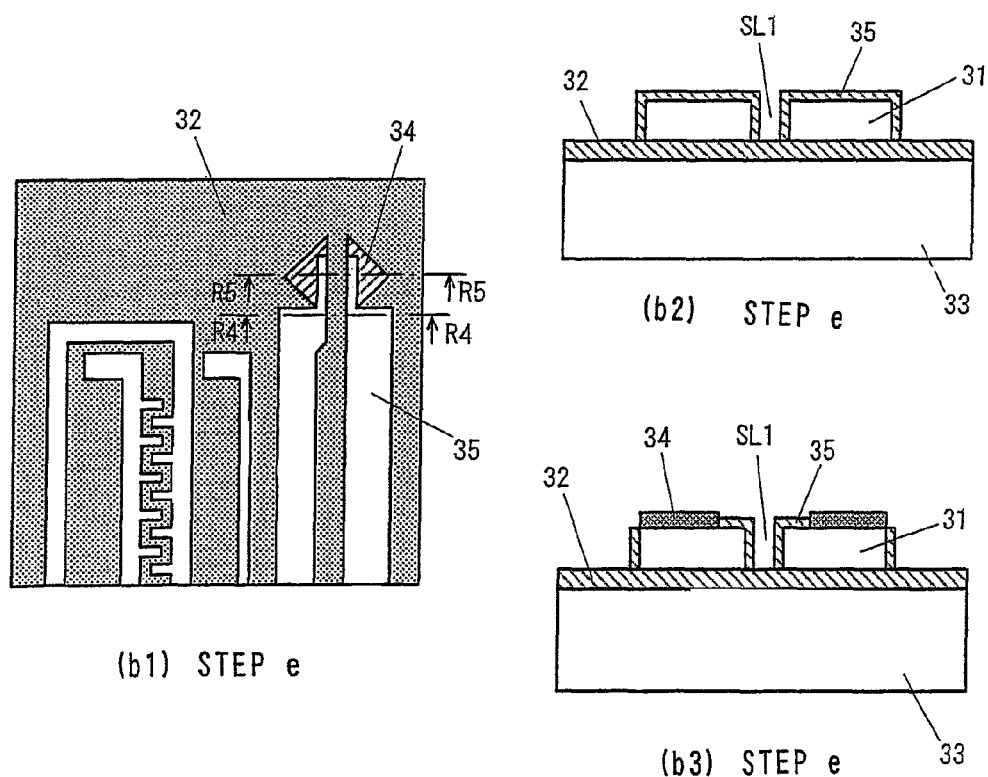
(b1) STEP e
(b2) STEP e
(b3) STEP e

MASK M2

FIG. 14
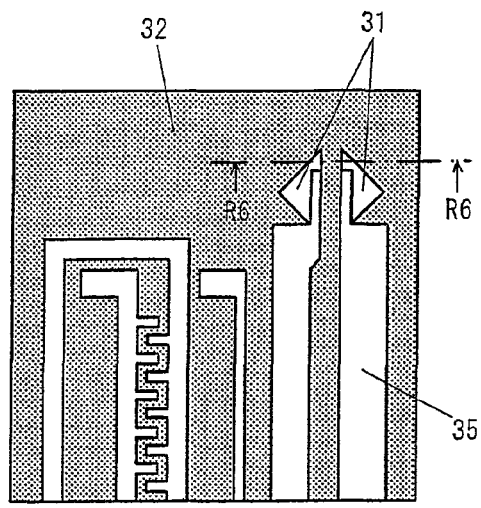
(a1) STEP f
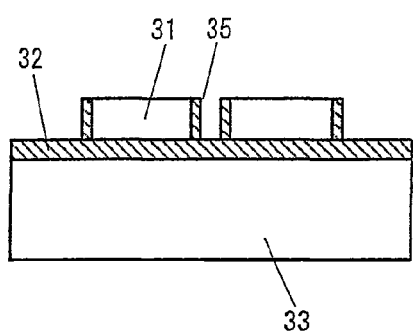
(a2) STEP f
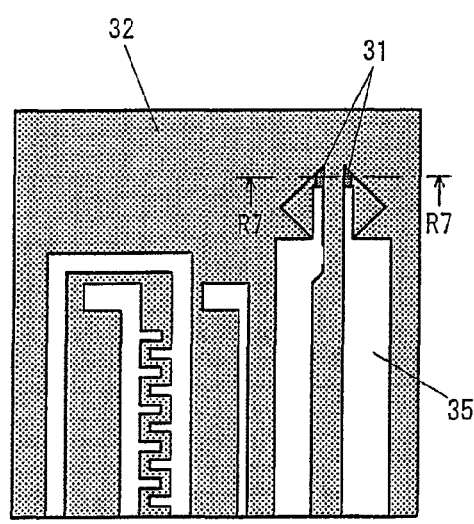
(b1) STEP g
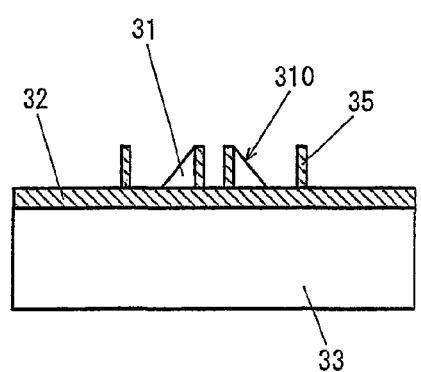
(b2) STEP g

MASK M4

MASK M3

AFM TWEEZERS, METHOD FOR PRODUCING AFM TWEEZERS, AND SCANNING PROBE MICROSCOPE

INCORPORATION BY REFERENCE

The disclosure of the following priority application is herein incorporated by reference:
Japanese Patent Application No. 2007-165641 filed Jun. 22, 2007.

BACKGROUND OF THE INVENTION

1. Field of the Invention

The present invention relates to AFM (Atomic Force Microscope) tweezers with a probe that can be used as a probe tip for use in a scanning probe microscope, to a method for producing such AFM tweezers, and to a scanning probe microscope.

2. Description of Related Art

So-called AFM tweezers that include two probes between which a sample is to be inserted and grip/release the sample have been developed to be applied to manipulation of samples to be observed by a scanning probe microscope.

Such AFM tweezers in a cantilever used in, for example, a scanning probe microscope include the following: (1) AFM tweezers including two carbon nanotubes attached to a probe tip attached to the tip of a cantilever made of silicon (see Japanese Laid-Open Patent Publication No. 2001-252900); (2) AFM tweezers including carbon nanotubes attached to a glass tube that serves as a cantilever; and (3) AFM tweezers including two cantilevers fabricated on a silicon substrate by a MEMS (Micro Electro Mechanical Systems) process.

In the tweezers (1) and (2) above, electrostatic electricity is applied between carbon nanotube probe tips to open/close the two carbon nanotubes. Examples of the tweezers (3) above include the following. In one example, current is applied to bases of the cantilevers of the tweezers to generate heat and linear expansion of silicon cantilevers due to the generated heat is amplified to drive the cantilevers. In another example, a comb-shaped electrostatic actuator is provided to enable the two cantilevers to grip an object therebetween (see Tetsuya Takekawa, Gen Hashiguchi, Eiichi Tamiya, et al., "Study of AFM tweezers for manipulation of nano objects", Extended Summary of The Institute of Electrical Engineers of Japan, Trans. SM, Vol. 125, No. 11, 2005).

Conventional devices, however, are each configured to grip a sample with very thin carbon nanotubes, so that they grip the samples only unstably and manipulations for gripping are difficult to do. The AFM tweezers described in "Study of AFM tweezers for manipulation of nano objects" include a knife-edged probe, and the shape of the probe tip is reflected on the obtained AFM image to produce a false image. As a result, shape information such as width and height of the sample gripped by the tweezers is difficult to obtain.

SUMMARY OF THE INVENTION

AFM tweezers according to a first aspect of the present invention includes: a first probe that comprises a triangular prism member having a tip of a ridge which is usable as a probe tip in a scanning probe microscope; a second probe that comprises a triangular prism member provided so as to open/close with respect to the first probe, wherein: the first probe and the second probe are juxtaposed such that a predetermined peripheral surface of the triangular prism member of the first probe and a predetermined peripheral surface of the triangular prism member of the second probe face substantially in parallel to each other, and the first probe has a notch that prevents interference with a sample when the sample is scanned by the tip of the ridge.

According to a second aspect of the present invention, in the AFM tweezers according to the first aspect, the notch may be configured such that a predetermined region of the ridge in a vicinity of the tip of the ridge is void to provide a wedge shape portion including the tip of the ridge, the wedge being arranged in a direction of the ridge.

A scanning probe microscope according to a third aspect of the present invention includes: the AFM tweezers according to the first aspect; a scanning driving unit that relatively moves the AFM tweezers with respect to a sample to perform scanning driving of the tip of the ridge of the first probe to scan the sample; an opening/closing driving unit that opens/closes the second probe; and a detecting unit that detects a displacement of the first probe upon the scanning driving, wherein: a surface configuration of the sample is determined based on the displacement detected by the detecting unit.

According to a fourth aspect of the present invention, in the scanning probe microscope according to the third aspect, assuming that a height of the sample from a mounting surface on which the sample is placed is $d1$ and an angle between the mounting surface and the ridge is $\theta$ deg, it is preferable that a notch surface of the notch includes: a first notch surface that passes between the tip of the ridge and a position on the ridge at a distance of $d1/(2 \sin \theta)$ from the tip and that is at an angle of $(90-\theta)$ to the ridge; and a second notch surface that passes a position on the ridge at a distance of $d1/\sin \theta$ from the tip of the ridge and that is orthogonal to the first notch surface.

According to a fifth aspect of the present invention, in the scanning probe microscope according to the fourth aspect, the first notch surface may be provided with a nanotube perpendicular to the mounting surface, with a tip of the nanotube protruding closer to the mounting surface than an end of the first probe on the side of the mounting surface, so that the tip of the nanotube is used as a probe tip for observation.

According to a sixth aspect of the present invention, in the scanning probe microscope according to the fifth aspect, a drive control unit may be further included that controls the AFM tweezers to be moved such that a lower end of the first probe is moved to a predetermined height from the mounting surface and the first and the second probes to dose to grip the sample, and it is preferable that an amount of protrusion of the nanotube is set to be greater than the predetermined height.

According to a seventh aspect of the present invention, in the scanning probe microscope according to the fourth aspect, the first notch surface that passes the tip on the ridge may be configured such that a size of a portion including the tip of the ridge in a direction perpendicular to the first notch surface is decreased, and a protrusion protruding toward the mounting surface may be provided on the second notch surface of the first probe such that a distance between the protrusion and the mounting surface is greater than a distance between the tip and the mounting surface, and the distance between the protrusion and the tip is smaller than a size of the sample in a direction along the mounting surface.

According to an eighth aspect of the present invention, in a method for producing the AFM tweezers according to the first aspect, a semiconductor wafer is processed by a photolithographic process to fabricate the first and the second probes.

According to a ninth aspect of the present invention, in the method for producing the AFM tweezers according to the eighth aspect, the first probe may be processed by the photolithographic process to form the notch.

According to a tenth aspect of the present invention, in the method for producing the AFM tweezers according to the eighth aspect, it is preferable that a region in which the notch of the first probe is to be formed is exposed to a focused ion beam to form the notch.

According to an eleventh aspect of the present invention, in the method for producing the AFM tweezers according to the eighth aspect, tips of the first and the second probes may be exposed to a focused ion beam in a state in which the first and the second probes are closed to make lengths and heights of the tips of the first and second probes uniform therebetween.

BRIEF DESCRIPTION OF THE DRAWINGS

FIG. 4A illustrates the function of AFM tweezers in an observation state and FIG. 4B illustrates the function of AFM tweezers in a gripping state;

FIG. 10 illustrates processes a to c in a method for producing AFM tweezers according to an embodiment of the present invention, with (a1) and (a2) illustrating a step a, (b1) and (b2) illustrating a step b, and (c1) and (c2) illustrating a step c;

FIG. 12 illustrates processes d and e in a method for producing AFM tweezers according to an embodiment of the present invention, with (a1) and (a2) illustrating a step d, and (b1) to (b3) illustrating a step e;

FIG. 14 illustrates steps f and g in a method for producing the AFM tweezers according to an embodiment of the present invention, with (a1) and (a2) illustrating a step f, and (b1) and (b2) illustrating a step g;

DESCRIPTION OF PREFERRED EMBODIMENTS

Figure 1:
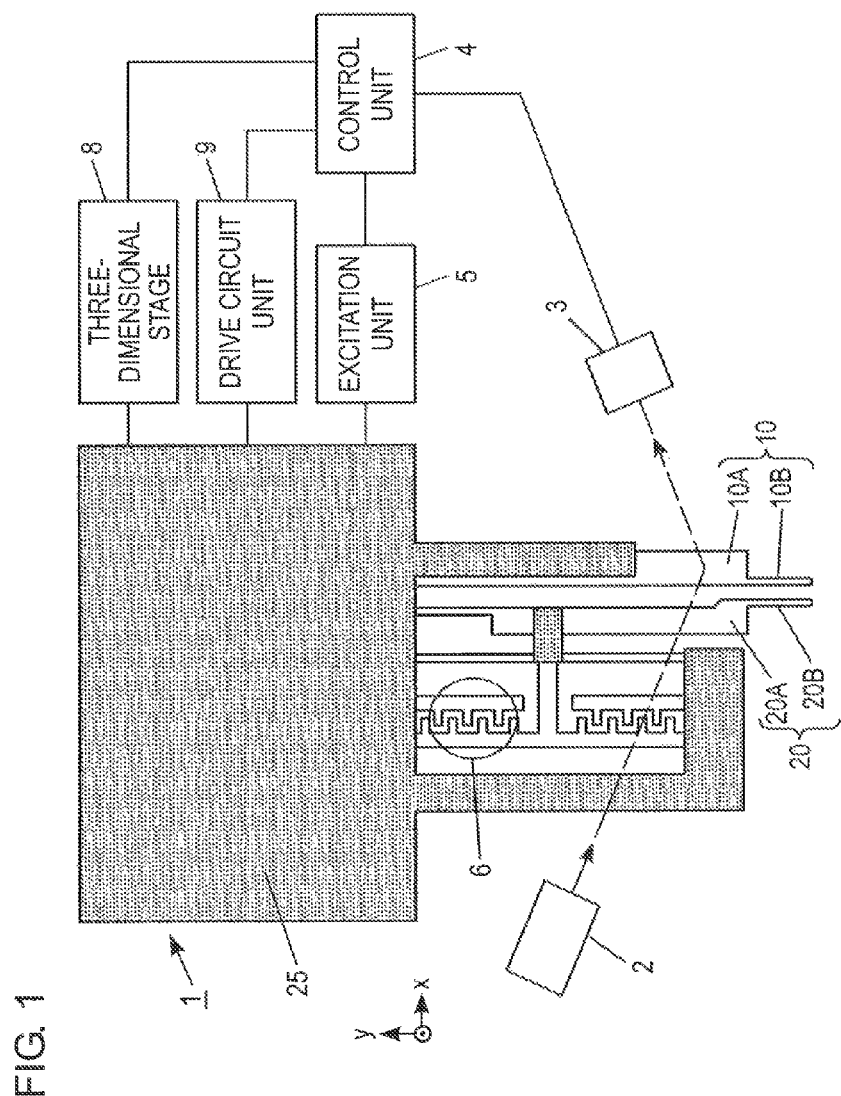
FIG. 1 schematically illustrates an atomic force microscope equipped with AFM tweezers according to an embodiment of the present invention.

The following explains a best mode for carrying out the invention with reference to the attached drawings. FIG. 1 schematically illustrates an atomic force microscope (hereafter, referred to as "AFM device"), which is a kind of a scanning probe microscope (SPM).

The AFM device includes AFM tweezers 1, a laser beam source 2, a 2-part or 4-part divided photodiode 3, a control unit 4, an excitation unit 5, an electrostatic actuator 6, a three-dimensional stage 8, and a driver circuit unit 9. The AFM tweezers 1, which include a stationary atm 10 and a movable arm 20 on a support 25, are fabricated by processing an SOI (Silicon on Insulator) wafer by using a photolithographic technology as described later on.

The stationary arm 10 includes a lever 10A and an observation probe 10B provided on a tip of the lever 10A. When AFM observation is performed with the AFM tweezers 1, a surface of an observation object is scanned with the observation probe 10B. The movable arm 20 includes a lever 20A and a gripping probe 20B provided on a tip of the lever 20A. The observation probe 10B and the gripping probe 20B are arranged substantially parallel to each other at a predetermined distance from each other. The movable arm 20 is driven to open/close the tweezers by the electrostatic actuator 6, which is comb-shaped.

The support 25 is removably held by a holder (not shown). The holder by which the support 25 is held is fixed on the three-dimensional stage 8 provided in the AFM device. By driving the three-dimensional stage 8, the AFM tweezers 1 in whole can be moved in each of x, y, and z directions accordingly. The support 25 can be attached to the holder in various manners. For example, the support 25 may be slid into a groove or concave portion formed in the holder to be fitted therein, or the support 25 may be sandwiched by leaf springs attached to the holder.

The laser beam source 2 emits a laser beam, which is irradiated onto an upper surface of the stationary arm 10 to generate a reflected laser beam. The reflected laser beam is detected by the 2-part or 4-part divided photodiode 3 to create a detection signal. The detection signal from the 2-part or 4-part divided photodiode 3 is input to the control unit 4, which controls the AFM device in whole. The control unit 4 calculates a change in displacement or vibration state (amplitude, frequency, and phase) of the stationary arm 10 based on the detection signal and controls the units such that an amount of change in displacement or vibration state will be constant and a surface profile of the sample is measured. The results of the measurement are displayed on, for example, a monitor (not shown). Though not shown, the excitation unit 5 is provided with a piezoelectric element that vibrates the AFM tweezers 1 in whole in the z direction to vibrate the stationary arm 10 and a driving unit that drives the piezoelectric element.

Figure 2:
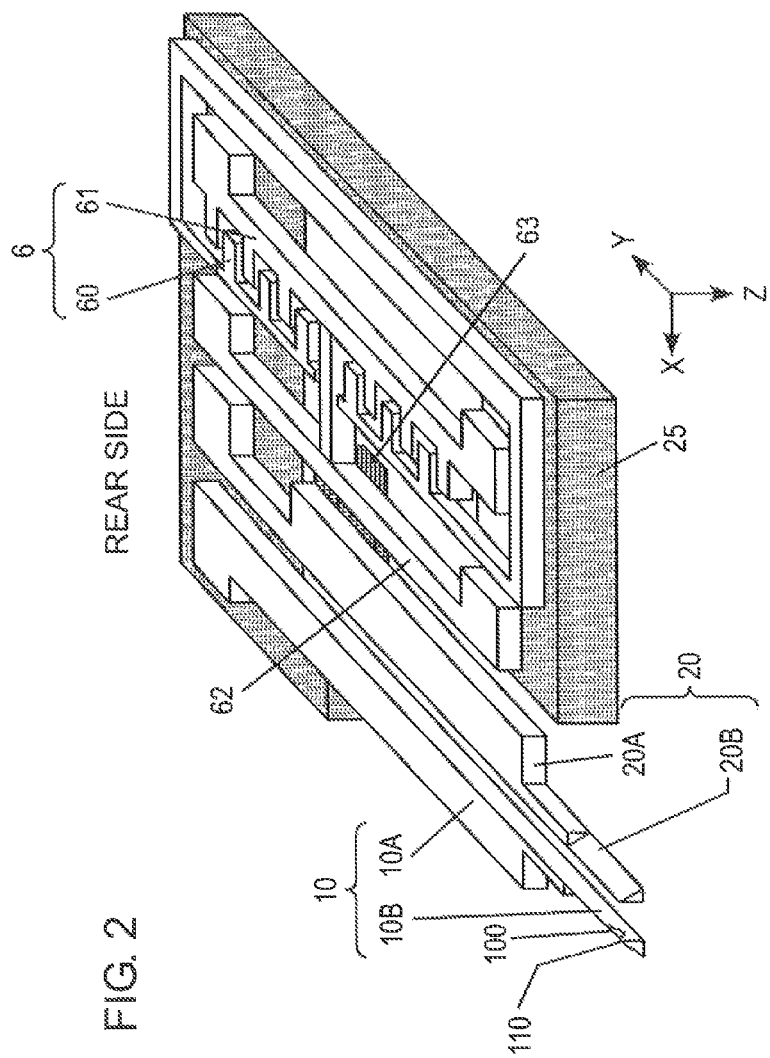
FIG. 2 is a schematic perspective view showing AFM tweezers.

FIG. 2 is a schematic perspective view showing the AFM tweezers 1 as seen from the rear side (from the −z direction). The electrostatic actuator 6 includes a comb-shaped stationary electrode 60 fixed to the support 25 and a comb-shaped movable electrode 61 connected to the movable arm 20. Arm opening/closing voltage is applied between the stationary electrode 60 and the movable electrode 61 by the driving circuit unit 9 to open/close the arm.

The movable electrode 61 is supported on the support 25 by an elastic support section 62. The elastic support section 62 is linked to the movable arm 20 through a linking member 63. With this construction, when arm opening/closing voltage is controlled so as to drive the movable electrode 61 in the x direction, the movable arm 20 is driven in a direction in which the AFM tweezers 1 are closed. As a result, a sample, which is present between the observation probe 10B and the gripping probe 20B, can be gripped therebetween.

The gripping probe 20B is a wedge-shaped probe having a rectangular triangle cross-section with its ridge being facing the −z direction. On the other hand, the observation probe 10B is generally a wedge-shaped probe having a rectangular triangle cross-section similarly to the gripping probe 20B. In the observation probe 10B, however, a part of the ridge taking the form of an acute angle and facing toward the −z direction (direction of observation sample) is notched to form a probe tip section 110 at the tip thereof. The observation probe 10B and the gripping probe 20B are arranged in juxtaposition such that vertical surfaces of the wedge-shaped probes face each other substantially in parallel.

Figure 3:
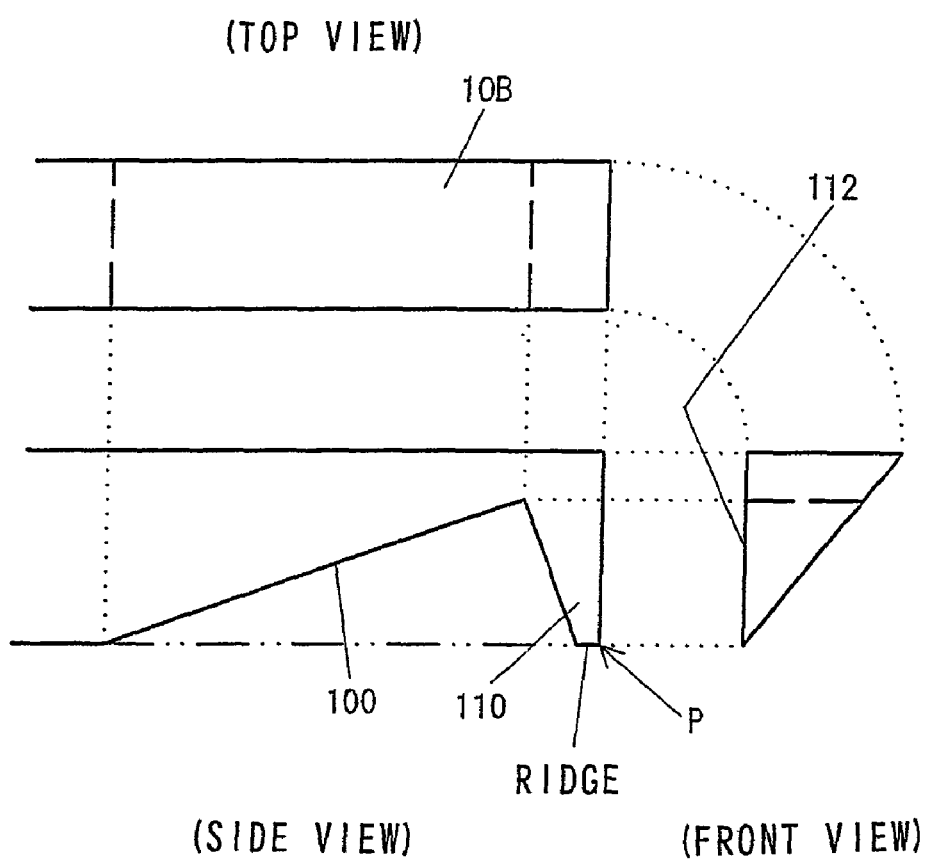
FIG. 3 illustrates the shape of an observation probe in a front view, a top view, and a side view.

FIG. 3 illustrates the shape of an observation probe 10B in a front view, a top view, and a side view. As shown in the part of the side view (down left), a notch 100 is formed along a part of the ridge to form a probe tip section 110 for AFM observation on the tip of the observation probe 10B. The observation probe 10B approaches to an observation plane at a tilt and the tip (designated by P) of the ridge of the probe tip section 110 is used as a probe tip. A vertical surface 112 of the observation probe 10B facing the gripping probe 20B is used as a gripping surface. A two-dot chain line indicates an edge region deleted when the notch 100 is formed.

<<AFM Observation>>

The AFM tweezers 1 according to the present embodiment serve as tweezers that grip a sample between the observation probe 10B and the gripping probe 20B and convey it and as a probe tip that performs AFM observation of the sample. As shown in FIG. 4A, when AFM observation is performed by using the AFM tweezers 1, the observation object is scanned by the probe tip section 110 formed on the tip of the observation probe 10B.

When observation is performed in a contact mode, the probe tip section 110 is moved in contact with the observation surface to perform XY scanning. On the other hand, when observation is performed in a dynamic force mode, XY scanning is performed while the observation probe 10B approached close to the observation surface is being resonantly vibrated up and down as shown in FIG. 4A.

When a distance (an average distance in the case of the dynamic force mode) between the tip of the probe tip section 110 and the observation object is changed due to unevenness of the surface of the observation object, an interaction between the surface of the observation object and the probe tip section 110 is changed. As a result, the lever 10A to which laser beam is irradiated is bent in the direction of up and down in the contact mode while the state of vibration of the lever 10A is changed in the dynamic force mode. These changes are measured by an optical lever measuring method in which the laser beam source 2 and the 2-part or 4-part photodiode 3 are used.

When the observation is performed in a dynamic force mode, the piezoelectric element provided in the excitation unit 5 is driven so as to vibrate the AFM tweezers 1 in whole in the z direction in order to resonantly vibrate at a large amplitude only the stationary arm 10 in the z direction as shown in FIG. 4A. On this occasion, vibration of only the stationary arm 10 can be achieved by design. That is, by designing the levers 10A and 20A such that a resonant vibration frequency f1 of the stationary arm 10 is higher than a resonant vibration frequency f2 of the movable arm 20 and setting the vibration frequency of the excitation unit 5 to the resonant vibration frequency f1, only the stationary arm 10 can be vibrated at a large amplitude.

<<Gripping of Sample>>

FIG. 4B illustrates gripping of a sample with the tweezers 1. When gripping the sample, direct current probe opening/closing voltage is applied and the level of voltage is controlled as mentioned above to perform closing driving of the movable arm 20, i.e., to move the movable arm 20 toward the stationary arm 10. As a result, the sample is gripped between the gripping probe 20B and the observation probe 10B. As mentioned above, the surfaces of the observation probe 10B and the gripping probe 20B facing each other are both vertical, so that the sample is gripped between the vertical surfaces.

<<Explanation on Shape of Observation Probe 10B>>

In the present embodiment, in order to enable gripping of the sample to be performed stably, the tweezers 1 are configured as follows. That is, the wedge-shaped observation probe 10B and the wedge-shaped gripping probe 20B are arranged such the vertical surfaces thereof are opposite to each other, so that the sample can be gripped therebetween. When AFM observation is performed, the tip of the lower ridge of the observation probe 10B is used as a probe tip.

Figure 5A:
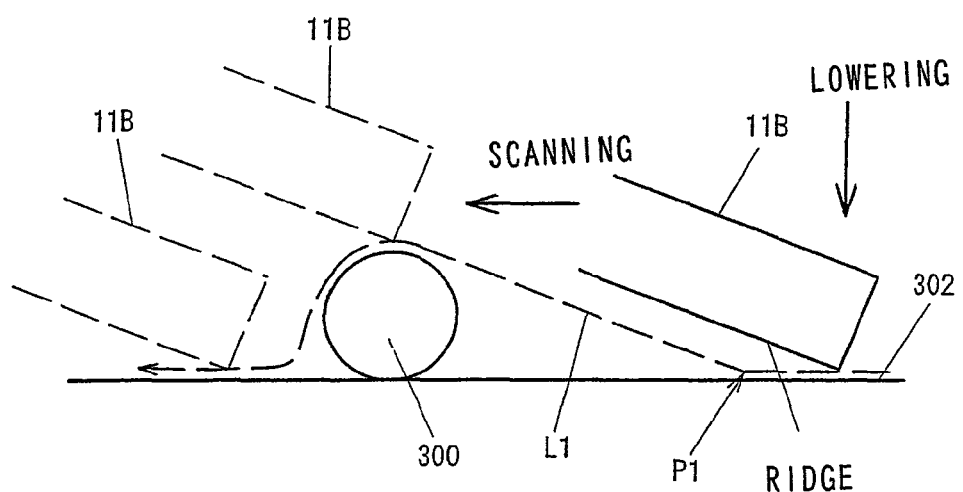
FIG. 5A illustrates a wedge-shaped observation probe while performing an action of observation, with L1 indicating a trajectory of the tip of the observation probe upon AFM observation
Figure 5B:
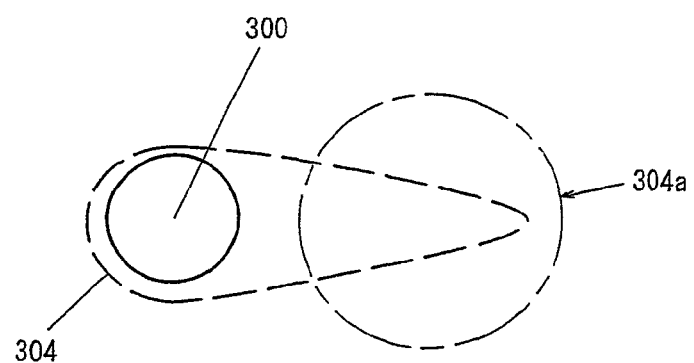
FIG. 5B shows an observed image obtained with the observation probe shown in FIG. 5A.

However, if the observation probe 10B has a shape similar to that of the gripping probe 20B, there will occur an inconvenience as shown in FIGS. 5A and 5B. The observation probe 10A shown in FIGS. 5A and 5B has a wedge shape similar to that of the gripping probe 20B. FIG. 5A illustrates the trajectory of the tip of an observation probe 11B upon AFM observation and FIG. 5B shows the observed image.

FIGS. 5A and 5B illustrate an example in which a spherical sample 300 mounted on an observation stage 302 is observed. As shown in FIG. 5A, the observation probe 11B is held at a tilt to a mounting surface of the observation stage 302 and approached down near the surface of the observation surface 302. Thereafter, the observation probe 11B is driven to scan in the direction of right to left in the figures. A broken line L1 indicates a trajectory of the tip of the observation probe 11B. Upon the AFM observation, the surface configuration of the observation object is measured based on the trajectory L1 of the observation probe 11B and the shape of a curve including a set of the trajectories L1 corresponds to the surface configuration of the observation object.

FIG. 5B is a plan view of the observation image 304 of the sample 300 obtained by the scanning shown in FIG. 5A. Since the sample 300 is spherical, it is desirable that the obtained image is circular. However, the observed image 304 shown in FIG. 5B is not in left-right symmetry and the right hand side (portion designated by 304a) of the observed image 304 is trailing. This is because when the tip of the observation probe 11B reaches a point P1 in FIG. 5A, the lower ridge of the observation probe 11B comes to interfere with the sample 300. As a result, the observation probe 11B is caused to scan such that the tip of the observation probe 11B is moved in a straight line on the trajectory L1 obliquely in the direction toward upper left to provide the observed image 304 as shown in FIG. 5B.

Figure 6A:
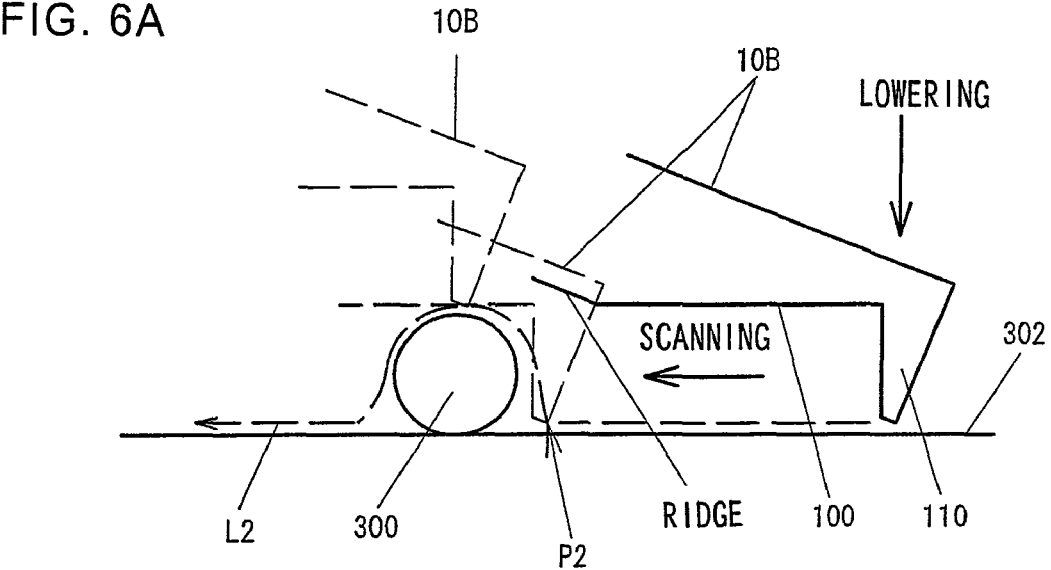
FIG. 6A illustrates a wedge-shaped observation probe with a notch while performing an action of observation, with L2 indicating a trajectory of the tip of the observation probe upon AFM Observation
Figure 6B:
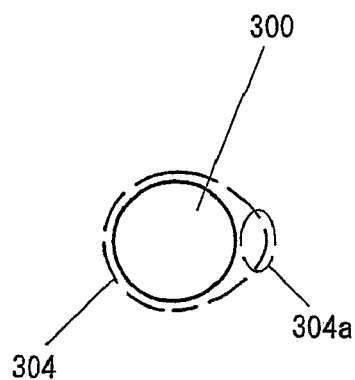
FIG. 6B shows an observed image obtained with the observation probe shown in FIG. 6A.

The AFM tweezers 1 according to the present embodiment are configured such that a part of the lower ridge of the observation probe 10B is formed of the notch 100 as shown in FIG. 3. This is to decrease the interference between the ridge portion and the sample upon scanning. FIGS. 6A and 6B illustrate the observed image obtained with the observation probe 10B.

FIG. 6A illustrates the trajectory L2 of the tip of the observation probe. Since the observation probe 10B is formed with the notch 100, the surface configuration of the observation stage 302 is observed until the probe tip section 110 approaches a position in the vicinity of the sample 300 (position indicated by a point P2). As a result, the trailing portion 304a is decreased to a minimal level in the observed image 304 shown in FIG. 6B, so that the observed image 304 has a close resemblance to the actual configuration of the sample 300.

Figure 7:
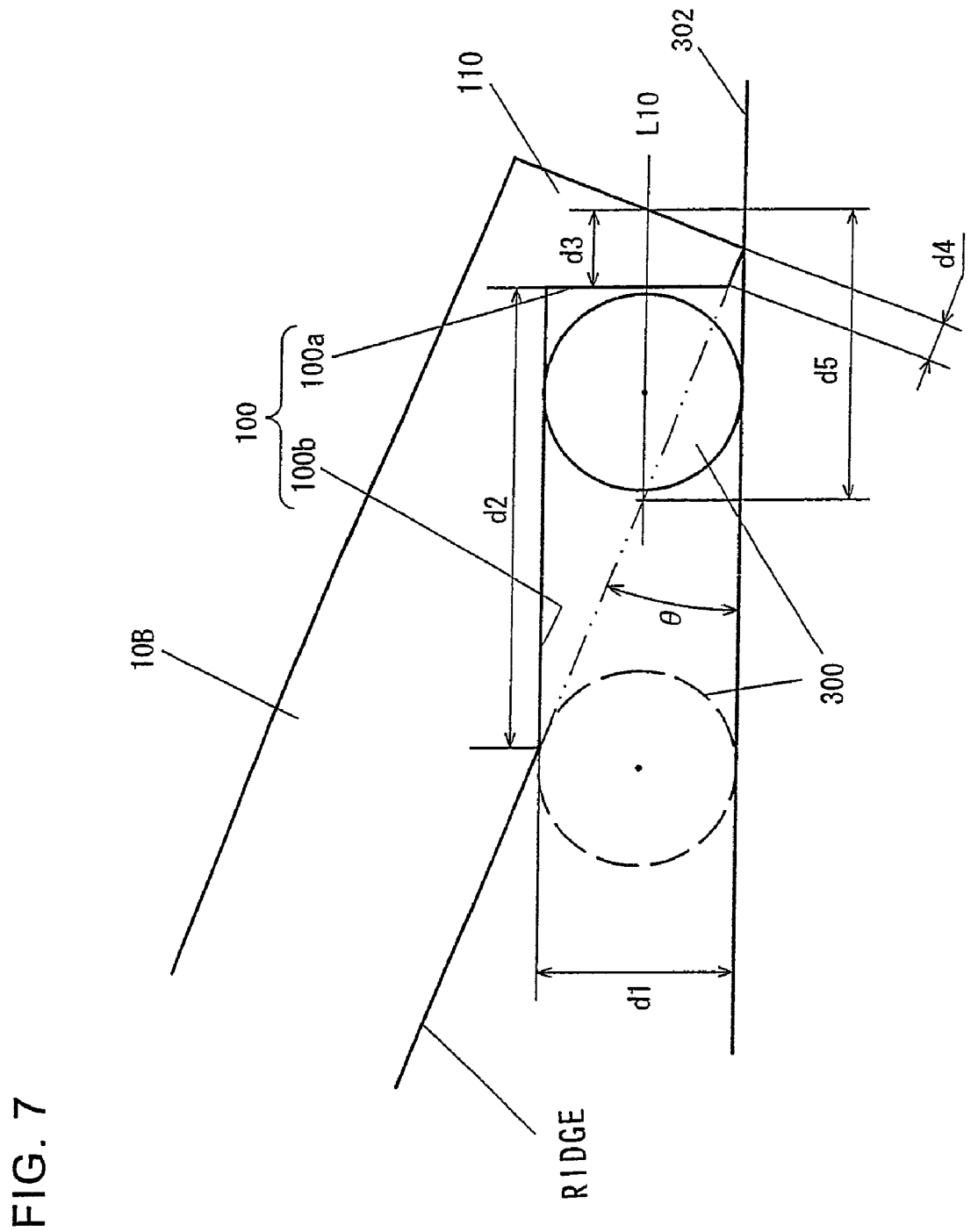
FIG. 7 illustrates the shape of the observation probe.

FIG. 7 illustrates the relationship between the shape and dimensions of the observation probe and the size of the sample 300. As mentioned above, the AFM tweezers 1 are held such that an angle between the observation probe 10B and the observation stage 302 is a predetermined angle θ so that AFM observation can be performed with the tip of the ridge of the observation probe 10B. A surface of the notch 100 includes a notch surface 100a that is vertical to the mounting surface of the observation stage 302 and a notch surface 100b that is parallel to the mounting surface of the observation stage 302.

It is assumed that a distance of the notch surface 100b from the lower end of the probe tip section 110 is d1. If a diameter of the spherical sample 300 mounted on the observation stage 302 is smaller than the distance d1, the sample 300 comes in under the notch surface 100b when the observation probe 10B scans in the direction toward left as indicated by arrow in FIG. 6A. This allows the probe tip section 110 to approach to the sample 300 to a position at which the vertical notch surface 100a almost contacts the sample 300.

As a result, as shown in FIGS. 6A and 6B, the configuration of the sample 300 can be measured more exactly than conventionally, so that the performance of the AFM observation can be improved. For example, assuming that a size of the notch surface 100b in the direction of right and left in FIG. 7 is d2, the length of the tail portion of the observed image 304 can be decreased by around [d2−d1/2−(d1/tan θ−D/tan θ)] than the case where the observation probe 11B is used. Here, D is a diameter of the spherical sample 300 and it is assumed that D≦d1. Assuming that a height of the sample from the mounting surface is d1 and an angle between the mounting surface and the ridge of the observation probe is θ, the notch surface 100a passes between the tip of the ridge and a position on the ridge at a distance of d1/(2 sin θ) from the tip at an angle of (90−θ) to the ridge. Moreover, The notch surface 100b, which is orthogonal to the notch surface 100a, passes a position of the ridge at a distance of d1/sin θ from the tip of the ridge. Assuming that a size d4 of the ridge at the probe tip section 110 is 0, i.e., d4=0, the tail portion of the observed image 304 is formed only to a negligible extent, if any.

Of course, when the diameter of the sample 300 becomes greater than d1, the ridge of the observation probe 10B interferes with the sample 300 before the notch surface 100a comes dose to the sample 300. As a result, the tail portion 304a of the observed image 304 becomes greater than the case where the diameter of the sample 300 is smaller than d1.

The gripping performance of the AFM tweezers 1 provided with the notch 100 is as follows. To simplify explanation, explanation is made on an example in which the spherical sample 300 is to be gripped. When the spherical sample 300 has a diameter of d1, the sample 300 can be gripped between the observation probe 10B and the gripping probe 20B if a position of the center of the sample 300 is in a region d3 when the gripping probe 20B is closed. The straight line L10 passes the center of the spherical sample 300 and is parallel to the surface of the observation stage 302. Assuming that the length of the ridge of the gripping section 110 is d4, the size d3 in the horizontal direction of the gripping section 110 can be expressed by formula (1) below:

$$d3 = d4 \cos\theta + (d1/2)\tan\theta \qquad (1)$$

On the other hand, when the notch 100 is not formed in the observation probe 10B, the horizontal size d5 with which the spherical sample 300 can be gripped can be expressed by formula (2) below. The two-dot chain line indicates the ridge in the case where the notch is not formed. That is, by forming the notch 100, the grippable range in which the sample 300 can be gripped is decreased by Δd shown in formula (3) below.

$$d5 = (d1/2)(\tan\theta + 1/\tan\theta) \qquad (2)$$

$$\Delta d = (d1/2)/\tan\theta − d4 \cos\theta \qquad (3).$$

As can be seen from FIG. 7, as the diameter of the sample 300 becomes smaller and smaller than d1, the ratio d3/d5 gradually approaches to 1 and when the diameter of the sample 300 is smaller than 2d4 sin gθ, there is obtained: d3/d5=1. That is, the influence of the provision of the notch 100 on the gripping performance is null. In addition, d4 may be set as indicated by formula (4) in order to make Δd=0. In this case, the tail portion in the observed image can be decreased while maintaining the gripping performance as high as the case where the notch 100 is not provided.

$$d4 = d1/(2 \sin\theta) \qquad (4)$$

Figure 8A:
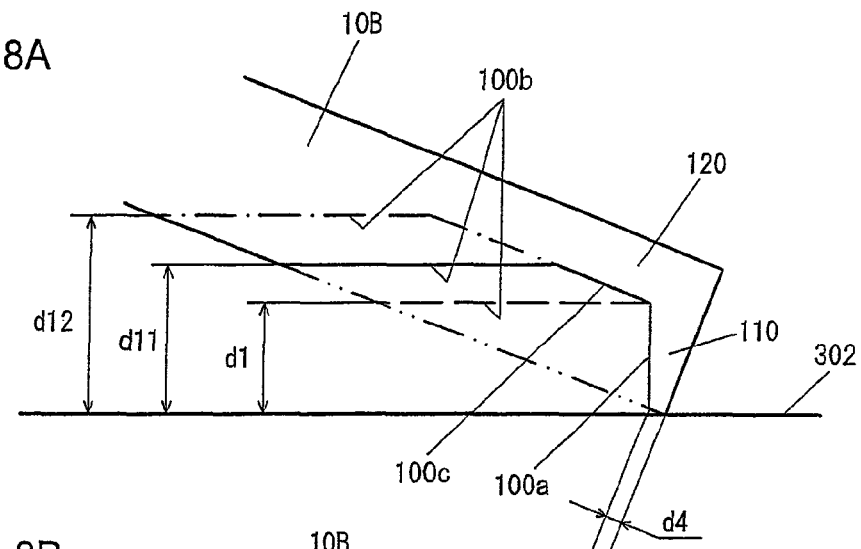
FIG. 8A shows an observation probe according to a first modification of the present invention.

When the height d1 of the notch surface 100b is increased in order to make it possible to perform observation of a larger sample with good precision, a cross-sectional area of a neck portion 120 where the notch surface 100b and the notch surface 100a cross each other becomes too small to maintain the strength of the observation probe 10B. Therefore, when the height d1 of the notch surface is increased, the neck portion 120 is formed to have a slanted notch surface 100c as shown in FIG. 8A, so that the neck portion 120 does not become too thin.

That is, the configuration of the notch 100 is determined depending on the length of the ridge region (shown in two-dot chain line). The notch surface 100c is a plane parallel to the upper surface of the observation probe 100b and connects the notch surface 100a and the notch surface 100b to each other. In FIG. 8A, the solid line indicates the case where the height of the notch surface 100b is d11, the broken line indicates the case where the height of the notch surface 100b is d1, and the dashed dotted line indicates the case where the height of the notch surface 100b is d12 (>d11).

Figure 8B:
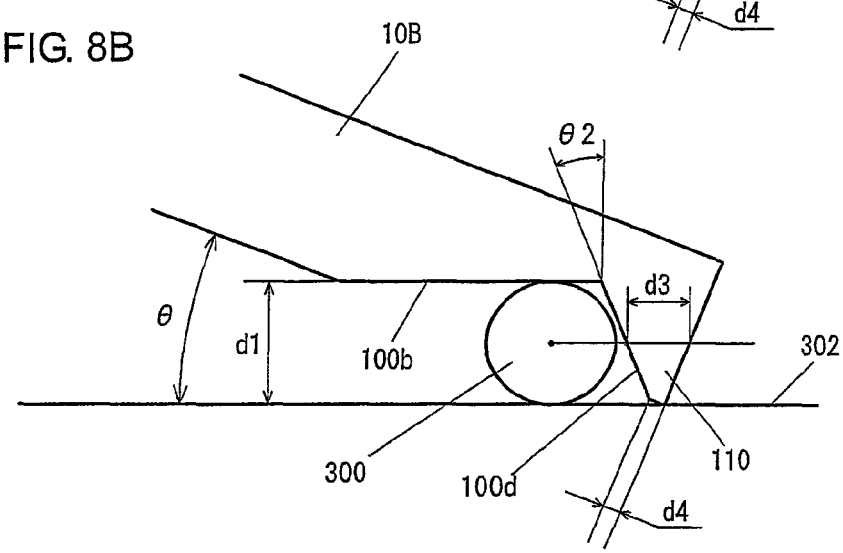
FIG. 8B shows an observation probe according to a second modification of the present invention.

FIG. 8B shows an observation probe according to another modification of the present invention. In the observation probe 10B shown in FIG. 8B, a slanted notch surface 100d is formed instead of the vertical notch surface 100a shown in FIG. 7. The notch surface 100d is at an angle of θ2 with respect to a vertical plane. In this case, the tail portion 304a of the observed image 304 becomes somewhat greater than the vertical notch surface 100a. The gripping performance, however, can be improved because the size d3 is increased. The size d3 is given by formula (5) below and is greater than the size d3 of the observation probe 10B shown in FIG. 7 by the second term in the right-hand side of the formula (5), $$d3=\{d4\cos\theta+(d^{1/2})\tan\theta\}+\{d^{1/2}-d4\sin\theta)\tan\theta2\} \quad (5)$$

Figure 8C:
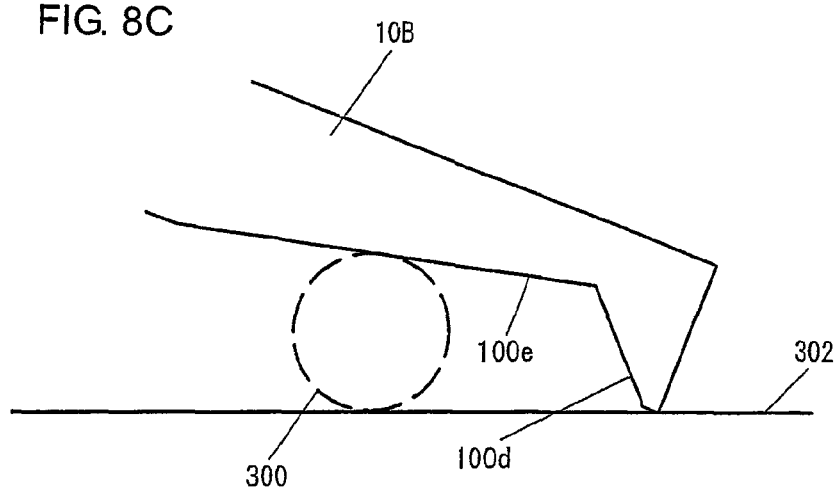
FIG. 8C shows an observation probe according to a third modification of the present invention.

FIG. 8C shows a third modification of the observation probe 10B. In the third modification, a slanted notch surface 100e is formed instead of the notch surface 100b parallel to the scanning surface of the observation probe 10B shown in FIG. 8B. With this configuration, the tail portion 304a can be decreased when a larger sample is scanned.

Figure 9A:
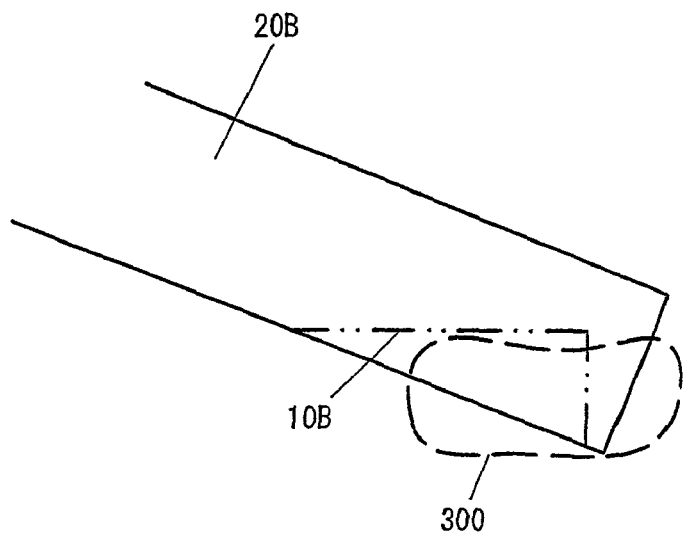
FIG. 9A shows a gripping probe according to a first example of the present invention.
Figure 9B:
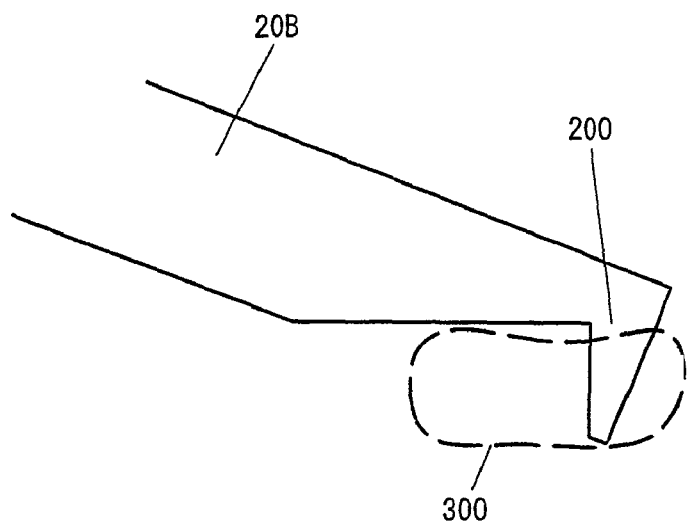
FIG. 9B shows a gripping probe according to a second example of the present invention and FIG. 9C shows a gripping probe according to a third example of the present invention.
Figure 9C:
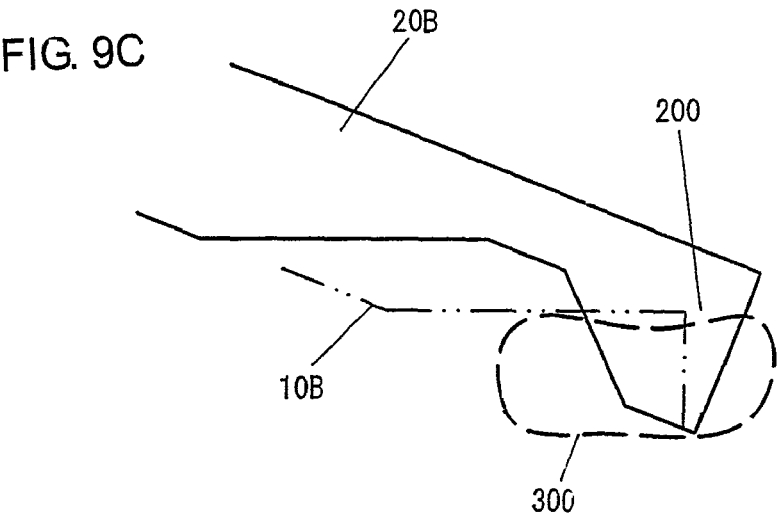

FIGS. 9A to 9C show the gripping probes with differently shaped vertical planes that serve as gripping surfaces. FIG. 9A shows the gripping probe 20B shown in FIG. 2. The two-dot chain line indicates the shape of the gripping surface of the observation probe 10B. When the sample 300 as shown in FIG. 9A is gripped, stability of gripping is improved since in spite of the relatively small contact surface of the gripping surface of the observation probe 10B, the contact surface of the gripping probe 20B is relatively large.

In FIG. 9B, the gripping probe 20B has a shape similar to that of the observation probe 10B, and a portion that faces the probe tip section 110 of the observation probe 10B is made a gripping section 200. In FIG. 9C, the size of the gripping section 200 facing the probe tip section 110 of the observation probe 10B is made larger than the case shown in FIG. 9B to make it easy to grip the sample 300.

<<Size of Sample and Grippable Range>>

Figure 21:
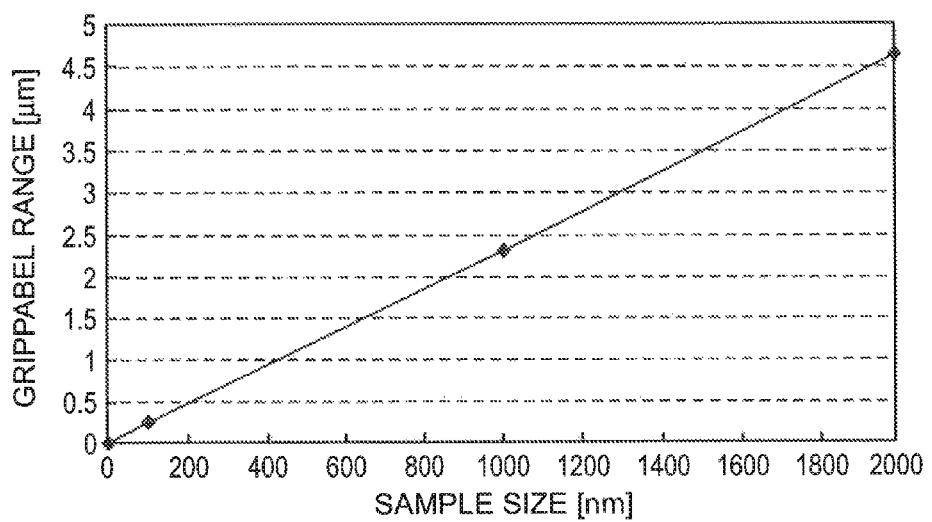
FIG. 21 is a graph plotting sample size vs. grippable range illustrating an example of grippable range when the observation probe is not formed of a notched portion.

Explanation is made on grippable range taking an example in which a spherical sample is to be manipulated. First, in the case where the notch 100 is not formed, assuming the angle θ between the observation probe 10B and the surface of the sample is 13 degrees, the grippable range is as shown in FIG. 21. The grippable range for typical diameters of samples is as shown in the following table. For example, when the diameter of the sample is 100 nm, the grippable range in which such sample can be gripped is 200 nm.

| Diameter of Spherical Sample (nm) | Grippable Range (nm) |
|---|---|
| 100 | 228 |
| 1000 | 2280 |
| 2000 | 4560 |

On the other hand, when the notch 100 is formed, if the diameter of the sample is greater than 2d4 sin θ, the grippable range is smaller than ever by the formula (3) above. Accordingly, the shapes of the tips of the observation probe 10B and the gripping probe 20B should be determined in a comprehensive manner based on the grippable range, processing precision of notch, precision of matching the probes, positioning precision of the three-dimensional stage, the strength of the observation probe 10B, and so on.

<<Production Method for AFM Tweezers 1>>

Explanation is made on a production method for AFM tweezers 1. The AFM tweezers 1 according to the present embodiment are integrally formed from an SOI (Silicon on Insulator) wafer. As will be detailed later on, the support 25 includes a Si layer, a $SiO_2$ layer, and a lower Si layer that constitute the SOI wafer. The stationary arm 10, the movable arm 20, and the electrostatic actuator 6 are formed on the upper Si layer. In the present embodiment, a SOI wafer having the thicknesses of the upper Si layer, the $SiO_2$ layer, and the lower Si layer of 6 µm, 1 µm, and 300 µm, respectively, is used. However, the combination of the sizes is not limited to the above-mentioned example.

FIGS. 10 to 16 illustrate a process for producing the AFM tweezers 1 according to the present embodiment. The process includes steps a to g that are carried out in order. In FIG. 10, (a1) and (a2) illustrate step a. (a1) is a perspective view and (a2) is a cross-sectional view. In step a, a SOI wafer 30 including an upper Si layer 31, a $SiO_2$ layer 32, and a lower Si layer 33 is provided, and a silicon nitride (SiN) film 34 having a thickness of 50 nm is formed on the upper Si layer 31. The upper Si layer 31 of the SOI wafer 30 is configured such that its surface is a main surface Si(001) of a Si single crystal.

In FIG. 10, (b1) and (b2) illustrate step b. (b1) is a perspective view and (b2) is an R-R cross-sectional view. In step b, the SiN film 34 is partially etched off by RIE (Reactive Ion Etching with $C_2F_6$ using a mask M1 shown in FIG. 11 to expose a portion of the upper Si layer 31 (outline region A1). The region A1 in which the SiN film 34 has been etched off is a region in which the stationary arm 10, the movable arm 20, and the electrostatic actuator 6 are formed. The <110> direction of the upper Si layer 31 is selected as the direction in which the tips of the stationary arm 10 and the movable arm 20 extend.

Figure 11:
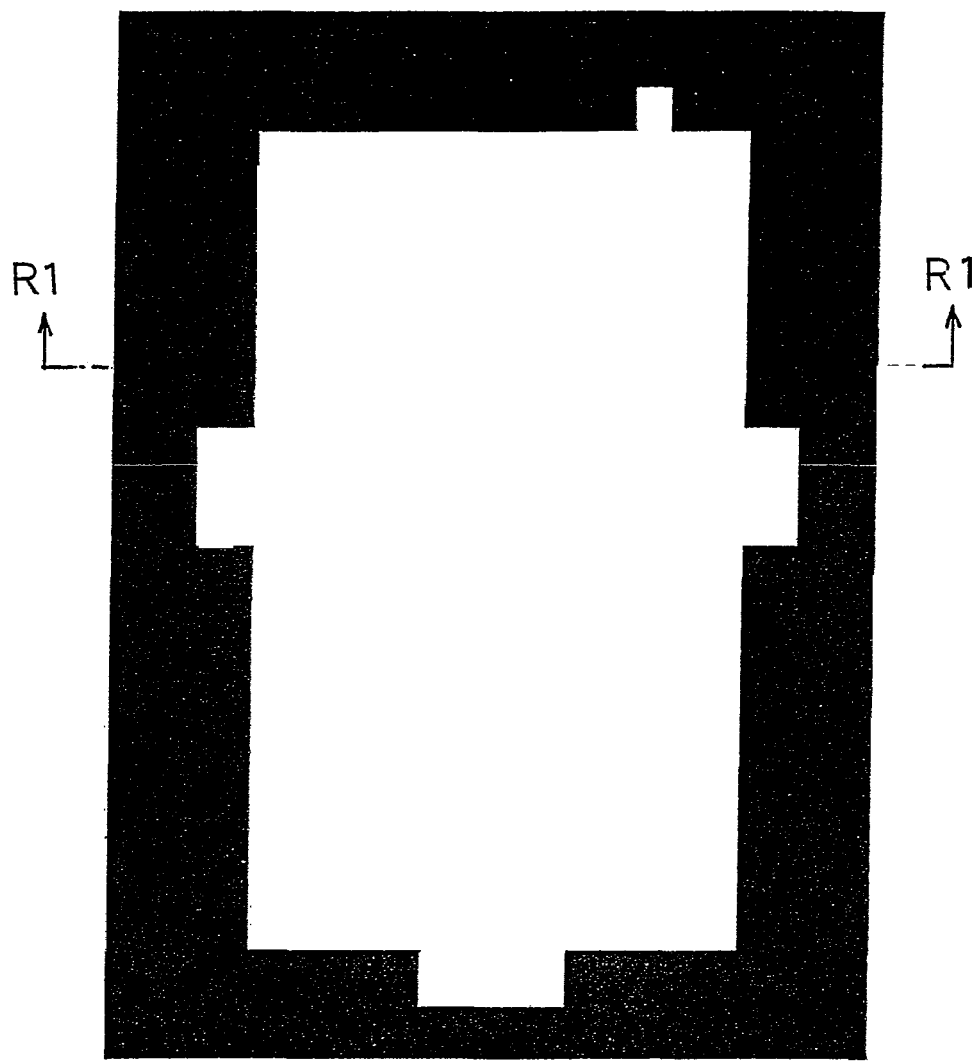
FIG. 11 shows a mask M1.
Figure 13:
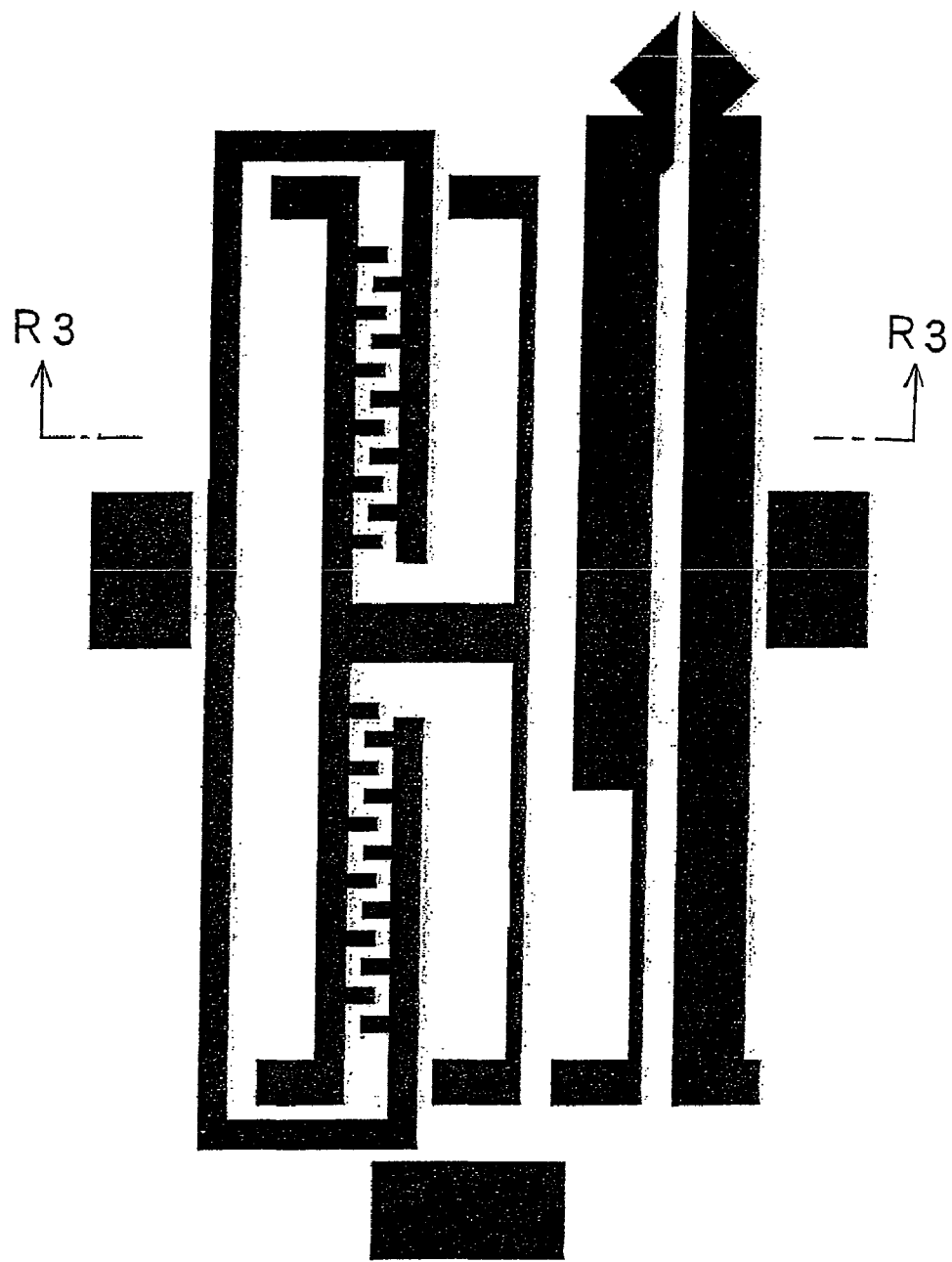
FIG. 13 shows a mask M2.

The mask M1 shown in FIG. 11 includes the region of the support 25. The portion shown in (b1) in FIG. 10 relates to the region above an R1-R1 line in FIG. 11. In the following, the region upper than the R1-R1 line is described.

In FIG. 10, in step c shown in (c1) and (c2), an oxide film 35 having a thickness of 0.1 µm is formed on the upper Si layer 31 in the region A1. As the oxidation method, a wet oxide method (steam oxidation) is used.

In FIG. 12, (a1) and (a2) illustrate step d. (a2) is an R2-R2 cross-sectional view of (a1). The portion shown in (a1) in FIG. 12 corresponds to a region above R3-R3 line of the mask M2 shown in FIG. 13. In step d, patterning of the surface configuration of the AFM tweezers 1 is performed using the mask M2 shown in FIG. 13. A comb shape is formed in this step. After the patterning, etching is conducted to the $SiO_2$ layer 32 by ICP-RIE (Inductively coupled plasma-Reactive Etching). By this etching, a narrow slit SL1 (in the direction of <110> of the upper Si layer 31) in positions in which the tips of the stationary arm 10 and the movable arm 20 is formed. The slit SL1 is etched vertically with respect to the surface of the substrate.

In FIG. 12, (b1) to (b3) illustrate step e. (b2) is an R4-R4 cross-sectional view. (b3) is an R5-R5 cross-sectional view. In step e, the exposed upper Si layer 31 is oxidized by the wet oxidation method. Thereafter, in step f shown in (a1) and (a2) in FIG. 14, the SiN film 34 is etched off by RIE with $C_2F_6$ to expose the upper Si layer 31 that remains as the underlying layer of the SiN film 34, (a2) in FIG. 14 is an R6-R6 cross-sectional view.

The oxide film 35 formed by the wet oxidation method serves as a protective film for the upper Si layer 31 upon the etching of the SiN film 34. Among the RIE conditions, the pressure of $C_2F_6$ gas is increased to adjust etching selectivity between the SiN film 34 and the oxide film 35, thereby removing only the SiN film 34 as shown in (a2) in FIG. 14. As a result, the oxide film 35 that has been formed for protection remains, so that only the upper Si layer 31 under the SiN film 34 is exposed.

In FIG. 14, (b1) and (b2) illustrate step g. (b2) is an R7-R7 cross-sectional view. In step g, the exposed upper Si layer 31 is subjected to anisotropic etching with an aqueous 30% KOH solution. The portion protected by the oxide film is not etched and only the upper Si layer 31 is anisotropically etched to form a slanted surface 310. As a result, portions having a triangular cross-section corresponding to the probe tip section 10B and the gripping section 20B are formed. As mentioned above, the surface of the upper Si layer 31 is selected as the main plane (001) of the single crystal Si, so that the slant surface 310 formed by the anisotropic etching is the {111} plane of single crystal Si.

Figure 15B:
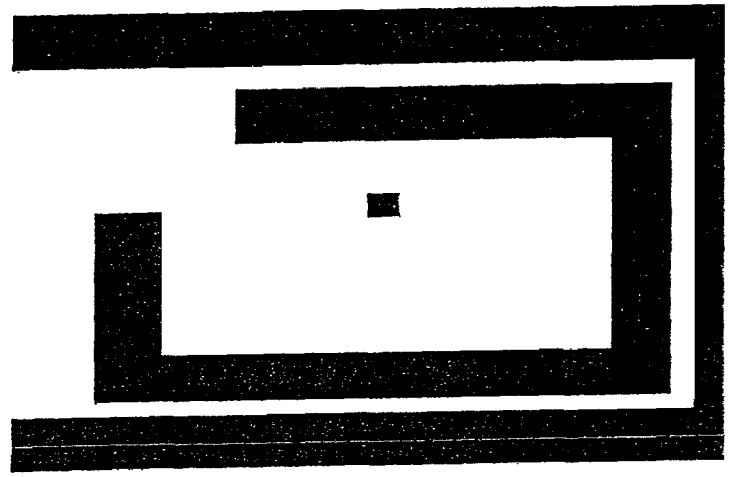
FIG. 15A shows a mask M3 and F15B shows a mask M4.
Figure 15A:
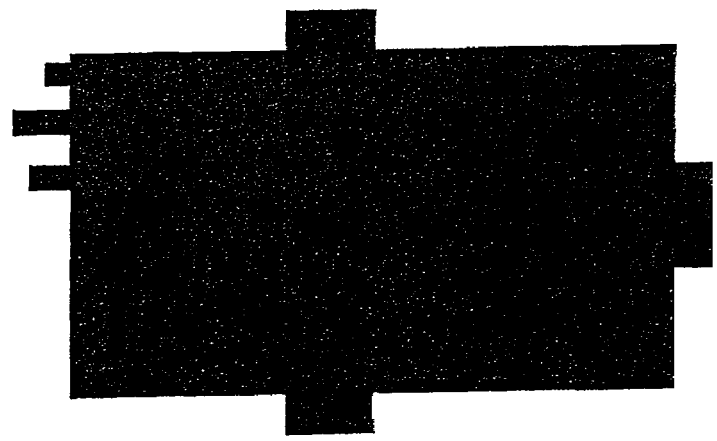
Figure 16:
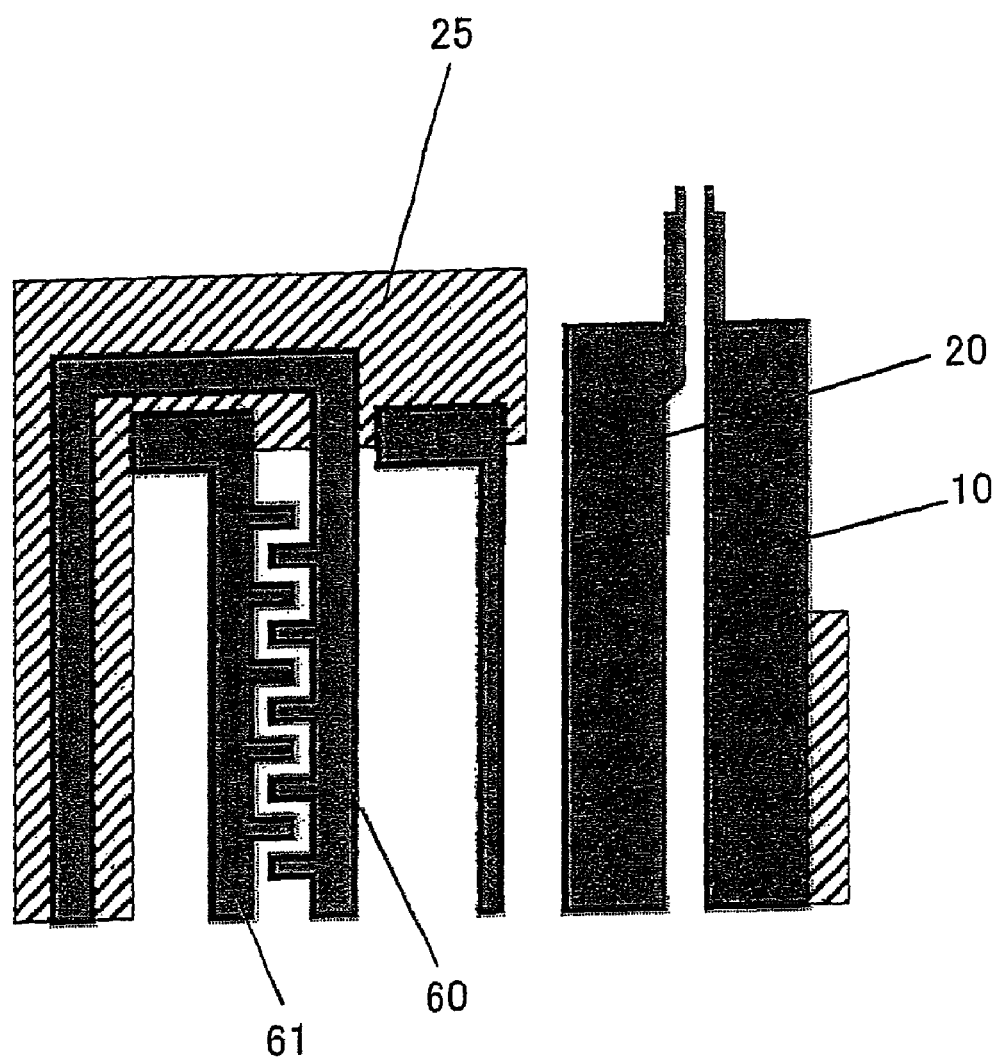
FIG. 16 shows AFM tweezers.

Etching is performed by ICP-RIE using the mask M3 shown in FIG. 15A to remove unnecessary portions. Thereafter, the oxide film is etched off. By the etching using the mask M3, the lengths of the probe tip section 10B and the gripping section 20B can be adjusted. Thereafter, unnecessary portions on the lower Si layer 33 side are etched off by ICP-RIE from the rear surface of the SOI wafer using the mask M4 shown in FIG. 15B. This etching stops at the $SiO_2$ layer 32. Then, unnecessary portions in the $SiO_2$ layer are removed with a hydrogen fluoride solution to provide a configuration of the AFM tweezers 1 as shown in FIG. 16 (as seen from the rear surface side).

Figure 17:
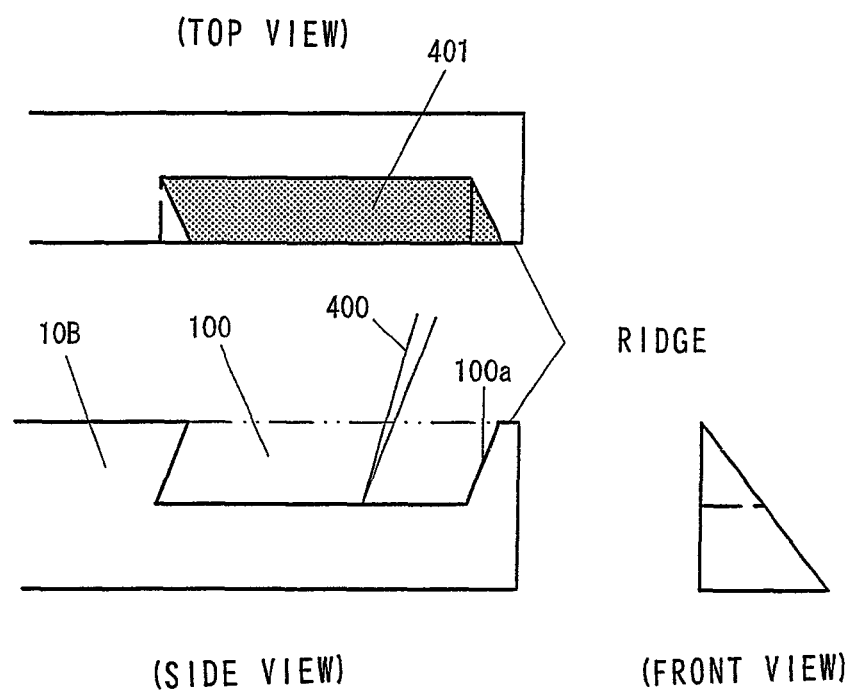
FIG. 17 illustrates a process of processing the tip of an observation probe with a convergent ion beam.

In this stage, the observation probe 10B and the gripping probe 20B have the same wedge shape. By processing the ridge portion of the observation probe 10 by FIB (Focused Ion Beam), the wedge-shaped notch 100 as shown in FIGS. 3 and 8 is formed. FIG. 17 shows an example of the method for processing the observation probe 10B using an FIB 400. The AFM tweezers 1 are set in a predetermined direction so that the FIB 400 is irradiated in a direction parallel to the notch surface 100*a* to be formed. Then the FIB 400 is irradiated to an irradiation region 401 to perform sputtering and when the depth of processing reaches a predetermined value, the irradiation is stopped. In this manner, by using FIB, there can be achieved notch processing in which the length and depth of the notch as well as angle of the notch surface are controlled.

Figure 22A:
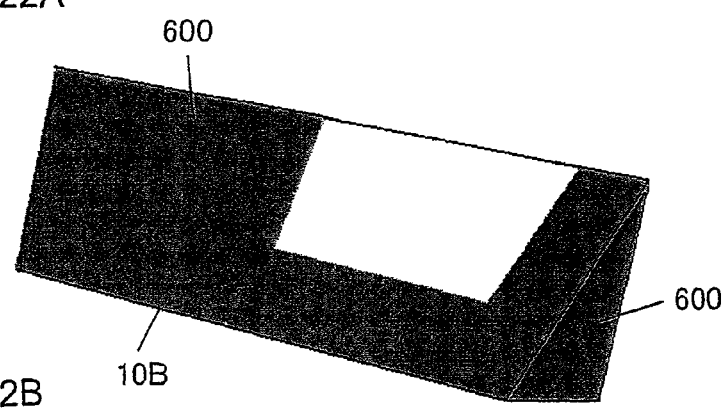
FIGS. 22A to 22C illustrate fabrication of a notched portion by anisotropic etching.
Figure 22B:
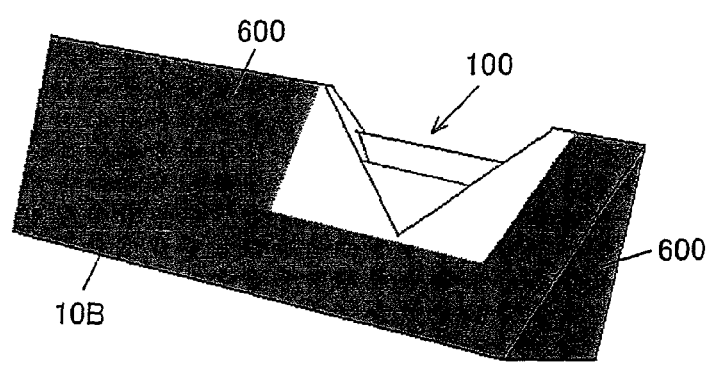
Figure 22C:
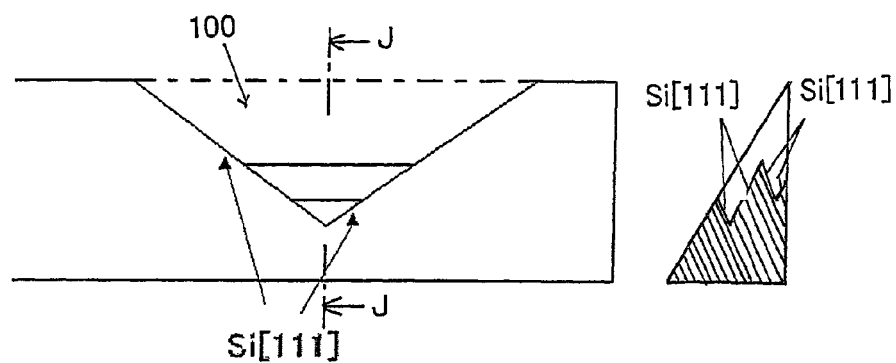

Instead of processing the notch 100 by FIB, the notch 100 may be processed by a photolithographic process. On the surface of the Si layer of the AFM tweezers 1 in the state as shown in FIG. 16 is formed an oxide film 600 by the wet oxidation method. Then, the oxide film 600 in the region where the notch 100 of the observation probe 10B is to be formed is removed to expose the Si layer (a portion of the wedge-shaped probe). The exposed Si layer is anisotropically etched with an aqueous 30% KOH solution. As a result, the notch 100 as shown in FIG. 22B is formed in the observation probe 10B. Thereafter, the oxide film 600 is removed. FIG. 22C shows the observation probe 10B formed with the notch 100 in a side view and a J-J cross-sectional view. The notch surface formed in the notch section 100 by the anisotropic etching is the {111} plane of single crystal Si.

Figure 23:
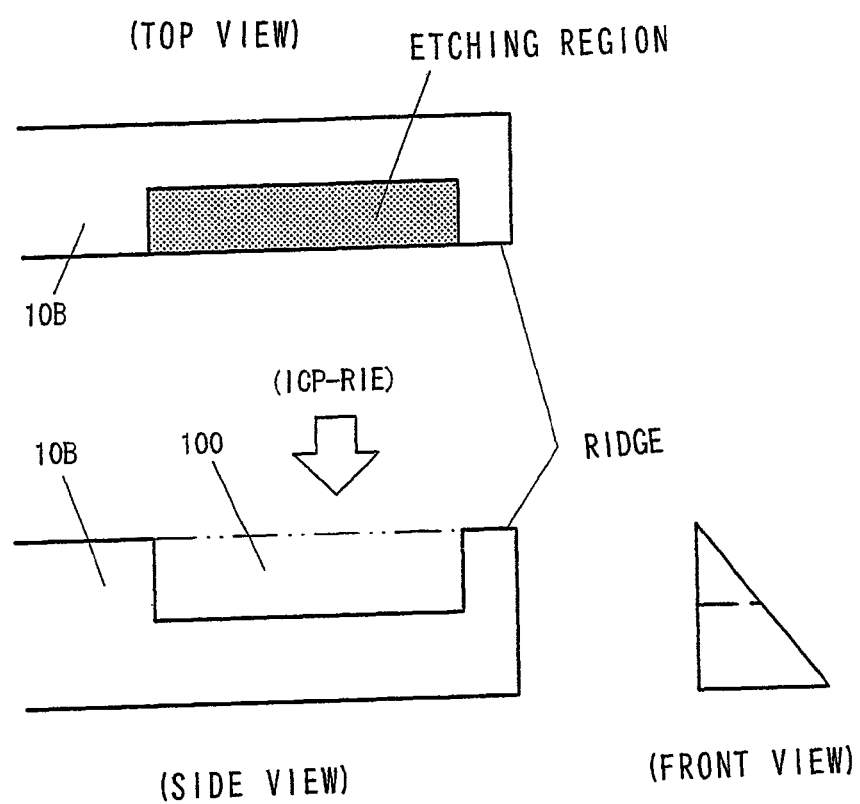
FIG. 23 illustrates fabrication of a notched portion by ICR-RIE.

Also, there may be used a method for forming the tweezers, in which method after portions of the observation probe and of the driving probe exclusive of the tips thereof are exposed, the exposed portions are etched by dry etching, such as ICP-RIE, to a desired depth to form the notch as shown in FIG. 23. In the case of ICP-RIE, the notch 100 is etched vertically as shown in FIG. 23. By using ICP-RIE, notch processing in which the length and depth of the notch are controlled can be performed.

As mentioned above, the AFM tweezers 1 according to the present embodiment are configured such that a sample is gripped by the gripping surfaces of the observation probe 10B and the gripping probe 20B that are parallel to each other. Accordingly, the gripping performance can be improved. Since the notch 100 is formed in the portion of the lower ridge of the observation probe 10B, occurrence of deformation of an AFM observed image due to interference between the ridge and the sample can be prevented. By designing the shape of the gripping probe 20B to be a wedge shape (triangular prism) as shown in FIG. 9A, or the shape shown in FIG. 9C, the observation performance can be improved while preventing the gripping performance from being deteriorated.

Second Embodiment

By providing the notch 100 as mentioned above, there can be obtained an image having less trailing without interference with the observation probe 10B even when the height of the sample to be gripped is relatively large. However, the tip of the observation probe 10B is wedge-shaped and hence further sharpening of the probe tip is necessary in order to perform image observation with high precision. On the other hand, further sharpening of the probe tip leads to a decrease in size (d3) of the gripping section 110, so that it is difficult to achieve stable gripping.

Figure 18B:
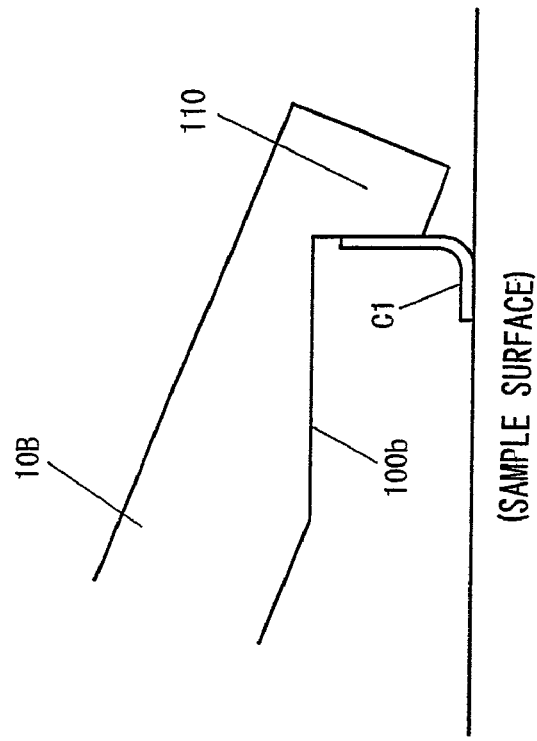
FIG. 18A shows an observation probe with a carbon nanotube attached to a tip thereof according to a second embodiment of the present invention and FIG. 18B illustrates elastic buckling of the carbon nanotube upon gripping by therewith.
Figure 18A:
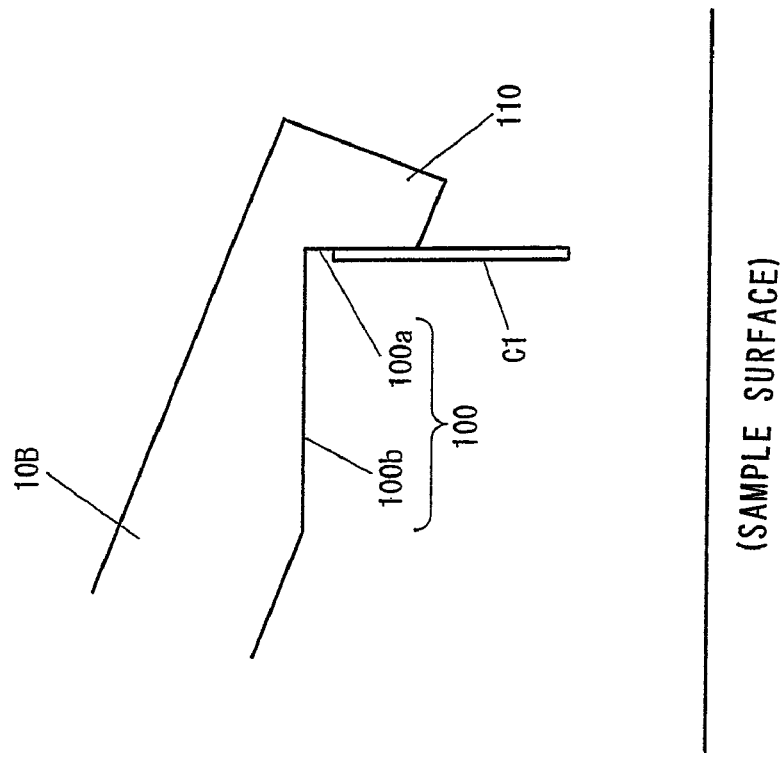

The surface of the notch 100 includes the notch surface 100*b* that is parallel to the mounting surface of the observation stage and the second notch surface 100*a* that passes through the tip of the ridge and is vertical to the mounting surface. In the second embodiment, as shown in FIG. 18A, a carbon nanotube (usually, a multiwall carbon nanotube) C1 is attached as a probe tip to the second notch surface 100*a*. The carbon nanotube C1 is attached vertically to a sample surface and the lower end of the carbon nanotube C1 is made to protrude closer to the sample surface side than the lowermost end of the observation probe 10B.

Upon gripping a sample, the observation probe 10B and the gripping probe 20B (not shown) are set at predetermined heights (usually, lower than a half of the height of the sample to be gripped). Usually, as shown in FIG. 18B, the carbon nanotube C1 is elastically buckled to be bent. In this state, the gripping of the sample by the tips of the probes is performed. When the AFM tweezers 1 are drawn up after completion of the gripping, the carbon nanotube C1 returns to its original shape without damage. The carbon nanotube C1 can endure repeated buckling that is repeated several hundred times.

Although explanation has been made on the example in which a carbon nanotube is used as the observation probe, similar effects can be obtained with an inorganic nanotube such as one made of boron nitride (BN).

Third Embodiment

Figure 19:
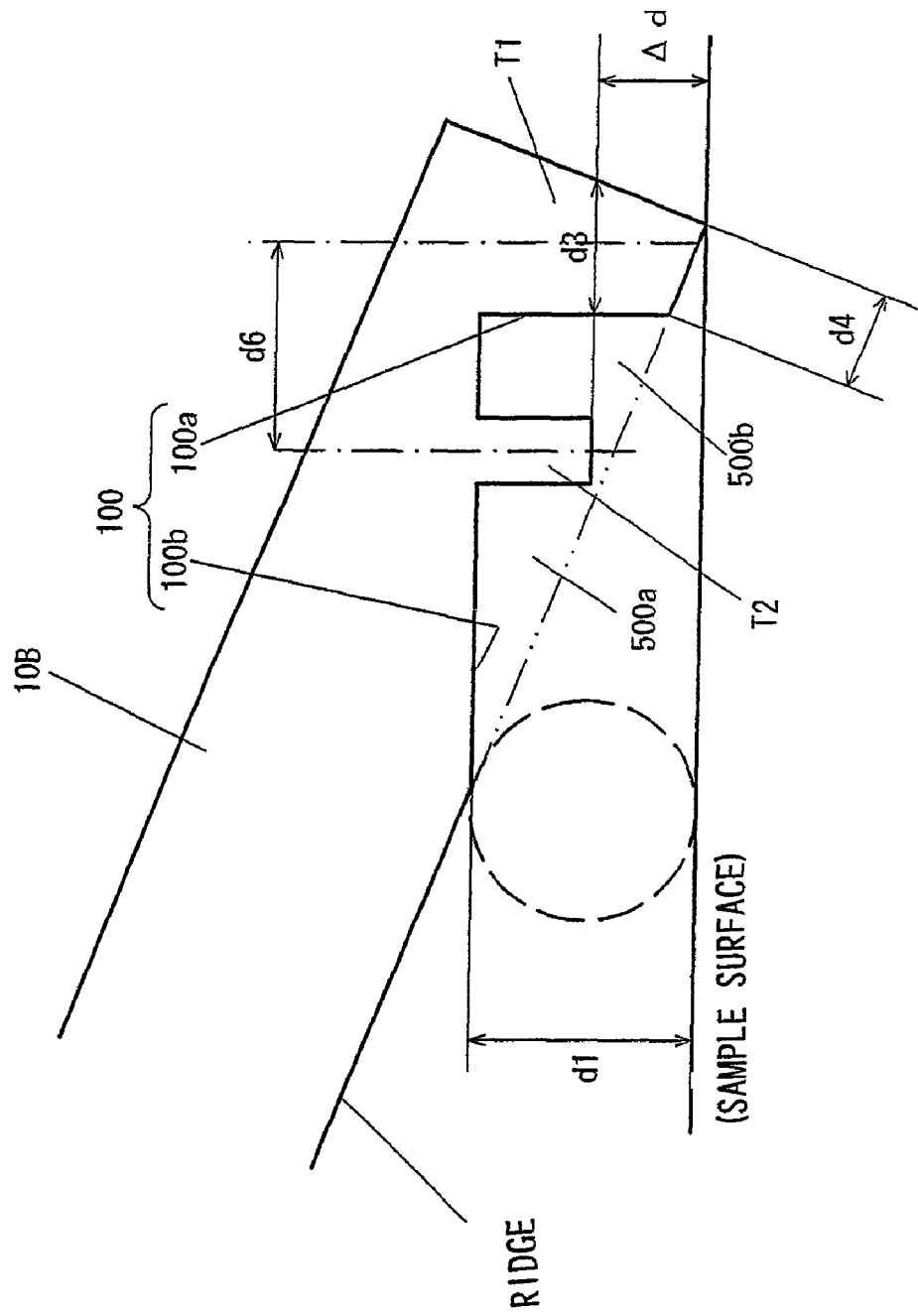
FIG. 19 shows a second probe tip formed in the observation probe.

FIG. 19 illustrates a third embodiment of the present invention. To improve observation performance, it is preferred that the probe tip T1 is processed to be relatively thin by adjusting widths d4 and d3 to be small so that the edges cross at a single point. However, when the probe tip T1 is made thinner, the gripping performance is decreased. Accordingly, in the third embodiment, a second probe tip T2 is formed at a position closer to the base of the probe than the first probe tip T1. A distance d6 between the centers of the probe tips T1 and T2 is set smaller than the length (the size in the direction along sample surface) of the sample to be gripped. The probe tip T2 is formed such that the lower end of the probe tip T2 is positioned by Δd higher than the lower end of the probe tip T1. With this configuration, the probe tip T1 that protrudes closer to the sample surface than the probe tip T2 serves as a probe tip of AFM. In this case, Δd is set to a half or less of the height of averaged samples.

When a sample is gripped with the AFM tweezers 1 having the above-mentioned configuration, the sample can be gripped at three positions, i.e., an inner surface of the gripping probe 20B, an inner surface of the probe tip T1 and an inner surface of the probe tip T2 of the observation probe 10B. This is advantageous when gripping spherical samples. In this case, the distance d6 is set to approximately the diameter of the spherical sample. When the distance d6 between the two probe tips T1 and T2 is set to a greater value, a longer sample can be stably gripped. In this case, when the height of the sample is by Δd higher than ever, occurrence of double tip image in which the image of the tip is seen doubled is imperative. In this case, the distance between the two images is equal to d6. Of the tip images in the double tip image, one having better resolution is due to the sharpened probe tip T1 and the other having worse resolution is due to the probe tip T2, On the other hand, no double tip image is observed from a substrate having the height of unevenness being smaller than Δd. Therefore, position and height of the sample to be gripped and the positional relationships between the two probe tips T1 and T2 are determined from the double tip image.

The second probe tip T2 is formed as follows. First, a left side notch 500a of the probe tip T2 shown in FIG. 19 is formed. Then, a notch 500b between the probe tips T1 and T2 is formed. Finally, the tip of the second probe tip T2 is cut off such that the height (from the sample surface) of the second probe tip T2 is by Δd greater than the height of the first probe tip T1. Further, as necessary, the first probe tip T1 is etched by FIB in order to set widths d4 and d3 relatively small so that each edge of the observation probe 10B crosses at a single point, thus sharpening the first probe tip T1.

While in the above description, explanation has been made on the example in which the second probe tip T2 is formed by etching using FIB, it would also be acceptable to fabricate it as follows. First, the notch 100 is etched by FIB to form the probe tip T1 on the tip of the observation probe 10B. Further, the probe tip T1 is processed by FIB to make the widths d4 and d3 relatively small and make the probe tip T1 thinner so that edges can cross at a single point. Then, an inclination at which the AFM tweezers 1 are attached is adjusted such that the AFM tweezers 1 are perpendicular to the sample surface and FIB is irradiated at a distance d6 from the first probe tip T1 on the side of the base of the probe at a decreased current density of FIB. On this occasion, a gas such as an organometal gas or phenanthrene is introduced into the chamber of the FIB device. The organometal gas or phenanthrene is decomposed to deposit a metal or carbon along the irradiated ion beam to grow a cylindrical structure. The diameter of the cylinder is about 100 nm. The length of the cylinder can be controlled by setting time of irradiation of the beam appropriately. The cylinder thus formed is used as the second probe tip T2.

<<Adjustment of Matching Precision between Observation Probe and Gripping Probe>>

Figure 20:
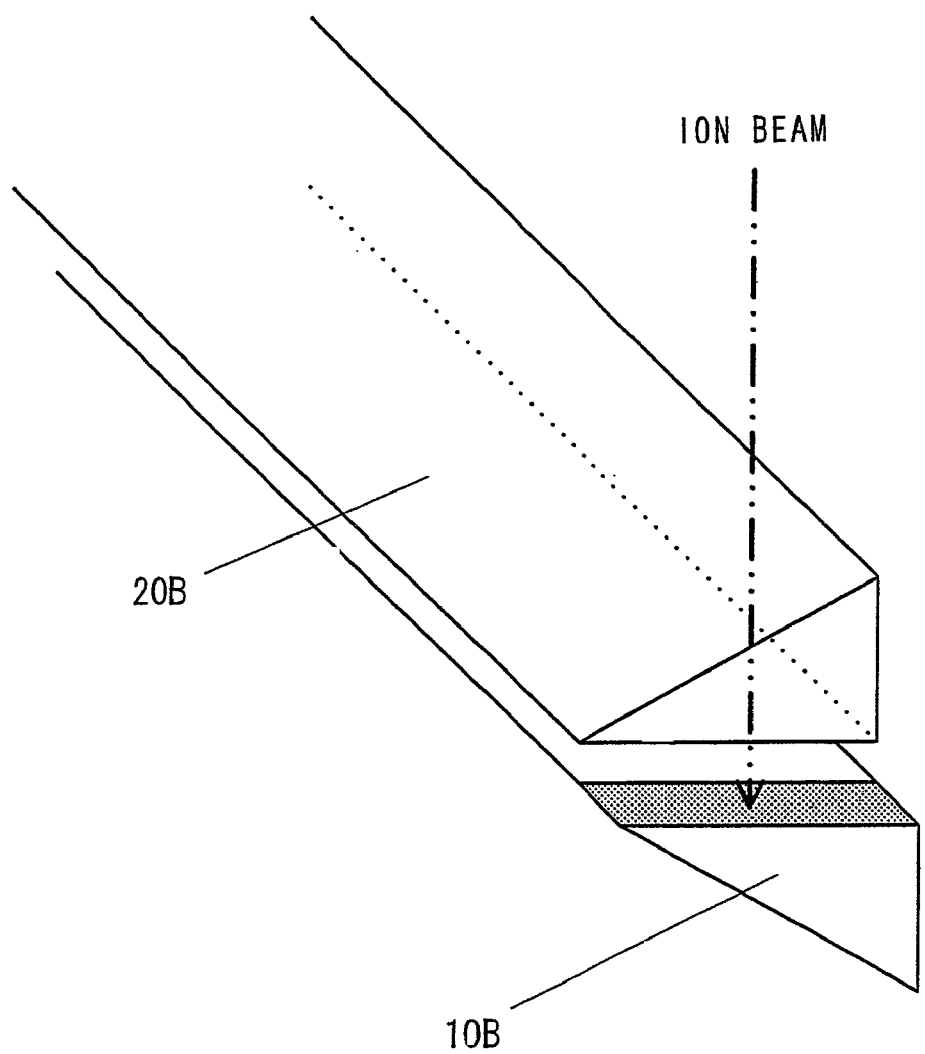
FIG. 20 illustrates adjustment of the length and height of the probe.

The matching precision of the observation probe 10B and the gripping probe 20B can be improved by performing etching processing using FIB as shown in FIG. 20. In FIG. 20, the AFM tweezers are mounted on a rotating goniostage at an angle of 90° from their ordinary setting position, and the observation probe 10B and the gripping probe 20b are closed. In an image capturing mode of FIB, matching condition of the lower ends of the tips of the two probes is observed from an appropriate direction in which the tips are easily viewed. The matching state between the observation probe 10B and the gripping probe 20B is observed and a portion that does not match (shaded portion) is cut off in an etching mode of FIB to adjust the matching state in the direction of lengths and heights of the observation probe 10B and the gripping probe 20B. Ordinarily, the notch is formed by FIB after the matching conditions of the observation probe 10B and the gripping probe 20B are adjusted by the above-mentioned operations.

In the above-mentioned embodiments, AFM tweezers 1 are fabricated by processing a silicon substrate. However, the present invention is not limited to such a method and the AFM tweezers 1 may be fabricated by various fabrication methods. What is described above is only exemplary. The present invention is not limited to the above-mentioned embodiments and various modifications may be made to the present invention so far as such modifications do not harm the features of the present invention.

According to the embodiments of the present invention, observation with high resolution and high precision and stable gripping can be made well balanced in a scanning probe microscope with AFM tweezers.

What is claimed is:

1. AFM tweezers comprising:
   a first probe that comprises a triangular prism member having a tip of a ridge which is usable as a probe tip in an atomic force microscope; and
   a second probe that comprises a triangular prism member provided so as to open/close with respect to the first probe, wherein:
   the first probe and the second probe are juxtaposed such that a predetermined peripheral surface of the triangular prism member of the first probe and a predetermined peripheral surface of the triangular prism member of the second probe face substantially in parallel to each other, and
   the first probe has a notch that prevents interference with a sample when the sample is scanned by the tip of the ridge.

2. AFM tweezers according to claim 1, wherein
   the notch is configured such that a predetermined region of the ridge in a vicinity of the tip of the ridge is void to provide a wedge shaped portion including the tip of the ridge, the wedge being arranged in a direction of the ridge.

3. An atomic force microscope comprising:
   the AFM tweezers according to claim 1;
   a scanning driving unit that relatively moves the AFM tweezers with respect to a sample to perform scanning driving of the tip of the ridge of the first probe to scan the sample;
   an opening/closing driving unit that opens/closes the second probe with respect to the first probe; and
   a detecting unit that detects a displacement of the first probe upon the scanning driving, wherein:
   a surface configuration of the sample is determined based on the displacement detected by the detecting unit.

4. An atomic force microscope according to claim 3, wherein:
   assuming that a height of the sample from a mounting surface on which the sample is placed is d1 and an angle between the mounting surface and the ridge is θ deg, a notch surface of the notch comprises:
   a first notch surface that passes between the tip of the ridge and a position on the ridge at a distance of d1/(2 sin θ) from the tip and that is at an angle of (90−θ) to the ridge; and
   a second notch surface that passes a position on the ridge at a distance of d1/sin θ from the tip of the ridge and that is orthogonal to the first notch surface.

5. An atomic force microscope according to claim 4, wherein:
   the first notch surface is provided with a nanotube perpendicular to the mounting surface, with a tip of the nanotube protruding closer to the mounting surface than an end of the first probe on the side of the mounting surface, so that the tip of the nanotube is used as a probe tip for observation.

6. An atomic force microscope according to claim 5, further comprising:
a drive control unit that controls the AFM tweezers to be moved such that a lower end of the first probe is moved to a predetermined height from the mounting surface and the first and the second probes to close to grip the sample, wherein:
an amount of protrusion of the nanotube is set to be greater than the predetermined height.

7. An atomic force microscope according to claim 4, wherein:
the first notch surface that passes the tip on the ridge is configured such that a size of a portion including the tip of the ridge in a direction perpendicular to the first notch surface is decreased, and
a protrusion protruding toward the mounting surface is provided on the second notch surface of the first probe such that a distance between the protrusion and the mounting surface is greater than a distance between the tip and the mounting surface, and the distance between the protrusion and the tip is smaller than a size of the sample in a direction along the mounting surface.

8. A method for producing the AFM tweezers according to claim 1, comprising:
processing a semiconductor wafer by a photolithographic process to fabricate the first and the second probes.

9. A method for producing the AFM tweezers according to claim 8, wherein:
the first probe is processed by the photolithographic process to form the notch.

10. A method for producing the AFM tweezers according to claim 8, wherein:
a region in which the notch of the first probe is to be formed is exposed to a focused ion beam to form the notch.

11. A method for producing the AFM tweezers according to claim 8, wherein:
tips of the first and the second probes are exposed to a focused ion beam in a state in which the first and the second probes are closed to make lengths and heights of the tips of the first and second probes uniform therebetween.

* * * * *